(12) United States Patent
Giancristofaro et al.

(10) Patent No.: US 11,372,099 B2
(45) Date of Patent: Jun. 28, 2022

(54) INNOVATIVE LOCATOR SYSTEM, RELATED LOW POWER CONSUMPTION REGENERATIVE TRANSPONDER AND RELATED LOCALIZATION METHOD AND SERVICE

(71) Applicant: THALES ALENIA SPACE ITALIA S.P.A. CON UNICO SOCIO, Rome (IT)

(72) Inventors: Domenico Giancristofaro, Rome (IT); Giacinto Losquadro, Rome (IT); Roberto Venturini, Rome (IT); Diego Calabrese, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 327 days.

(21) Appl. No.: 16/490,736

(22) PCT Filed: Mar. 9, 2018

(86) PCT No.: PCT/EP2018/055987
§ 371 (c)(1),
(2) Date: Sep. 3, 2019

(87) PCT Pub. No.: WO2018/162756
PCT Pub. Date: Sep. 13, 2018

(65) Prior Publication Data
US 2020/0003894 A1    Jan. 2, 2020

(30) Foreign Application Priority Data

Mar. 10, 2017  (IT) .......................... 102017000027029
Nov. 20, 2017  (EP) .................................... 17202637

(51) Int. Cl.
*G01S 13/90*    (2006.01)
*G01S 7/00*     (2006.01)
*G01S 13/76*    (2006.01)

(52) U.S. Cl.
CPC .............. *G01S 13/90* (2013.01); *G01S 7/003* (2013.01); *G01S 13/765* (2013.01)

(58) Field of Classification Search
CPC ......... G01S 13/90; G01S 7/003; G01S 13/765
See application file for complete search history.

(56) References Cited

U.S. PATENT DOCUMENTS 4,951,263 A * 8/1990 Shope ..................... G01S 1/725
                                                            367/137
5,365,551 A * 11/1994 Snodgrass ........... H04L 61/2084
                                                             380/34

(Continued)

FOREIGN PATENT DOCUMENTS

DE           3315499 C2    7/1987
WO    WO 2007/148199 A3    5/2008

OTHER PUBLICATIONS

Golomb et al., "Generalized Barker sequences", IEEE Transactions on Information Theory, (19650000), vol. 11, No. 4, pp. 533-537, Oct. 1965.

(Continued)

*Primary Examiner* — Thomas M Hammond, III
*Assistant Examiner* — Juliana Cross
(74) *Attorney, Agent, or Firm* — McCarter & English, LLP

(57) ABSTRACT

The present invention concerns a localization method for locating a target that is coupled with a locator transponder associated with a permanent identification code permanently assigned to said locator transponder; the localization method comprising: upon reception of a user request for locating the (Continued)

target, transmitting, by a paging system or by a radar-based system, a spread spectrum paging signal carrying the permanent identification code and a temporary identification code temporarily assigned to the locator transponder, wherein said temporary identification code is shorter than said permanent identification code; receiving, by the locator transponder, the spread spectrum paging signal and extracting, by said locator transponder, the temporary identification code carried by said spread spectrum paging signal received; transmitting, by the radar-based system, radar signals towards one or more areas of earth's surface or sky, and receiving, by said radar-based system, echo signals from said one or more areas of the earth's surface or sky; upon reception by the locator transponder of one or more radar signals transmitted by the radar-based system, generating and transmitting, by said locator transponder, a sequence of watermarked radar echo signals in which a spread spectrum watermarking signal is embedded, wherein said spread spectrum watermarking signal carries the temporary identification code extracted.

22 Claims, 10 Drawing Sheets

(56) References Cited

U.S. PATENT DOCUMENTS

| | | | | |
|---|---|---|---|---|
| 5,486,830 | A * | 1/1996 | Axline, Jr. | G01S 13/74 342/43 |
| 5,767,802 | A | 6/1998 | Kosowsky et al. | |
| 5,821,895 | A * | 10/1998 | Hounam | G01S 13/767 342/45 |
| 6,014,404 | A * | 1/2000 | Issler | H04B 1/70755 342/120 |
| 6,081,222 | A * | 6/2000 | Henkel | G01S 13/78 342/44 |
| 6,098,018 | A * | 8/2000 | Welsh | G01S 7/003 702/3 |
| 6,329,944 | B1 * | 12/2001 | Richardson | G01S 13/767 342/51 |
| 6,359,998 | B1 * | 3/2002 | Cooklev | A61F 2/44 382/248 |
| 6,577,266 | B1 * | 6/2003 | Axline | G01S 13/765 342/51 |
| 6,650,695 | B1 * | 11/2003 | Girard | H04L 27/2075 342/51 |
| 7,030,805 | B2 * | 4/2006 | Ormesher | G01S 13/9029 342/51 |
| 7,643,536 | B2 * | 1/2010 | Schaefer | H04B 1/707 375/150 |
| 7,822,969 | B2 * | 10/2010 | Anglin | G06T 1/0021 380/255 |
| 8,384,582 | B2 | 2/2013 | Chiassarini et al. | |
| 2004/0178944 | A1 * | 9/2004 | Richardson | G01S 13/904 342/51 |
| 2007/0222666 | A1 * | 9/2007 | Coulmeau | G01S 7/003 342/36 |
| 2010/0013700 | A1 * | 1/2010 | Chiassarini | G01S 13/90 342/25 F |
| 2010/0029380 | A1 * | 2/2010 | Rhoads | G07F 17/32 463/43 |
| 2010/0194622 | A1 * | 8/2010 | Clingman | G08G 5/06 342/386 |
| 2011/0249706 | A1 * | 10/2011 | Beeler | H04L 27/3488 375/146 |
| 2012/0195347 | A1 * | 8/2012 | Beeler | H04B 1/707 375/295 |
| 2016/0363648 | A1 * | 12/2016 | Mindell | G01S 7/003 |
| 2016/0363664 | A1 * | 12/2016 | Mindell | G01S 13/84 |
| 2016/0373894 | A1 * | 12/2016 | Evans | H04W 4/023 |
| 2018/0356516 | A1 * | 12/2018 | Fox | G01S 7/003 |
| 2019/0079177 | A1 * | 3/2019 | Lee | G01S 13/931 |

OTHER PUBLICATIONS

Gold, "Maximal recursive sequences with 3-valued recursive cross-correlation functions (Corresp.)", IEEE Transactions on Information Theory, (19680000), vol. 14, No. 1, pp. 154-156, Jan. 1968.

Lindner, "Binary sequences up to length 40 with best possible autocorrelation function", Electronics Letters, (19750000), vol. 11, No. 21, doi:doi:10.1049/el:19750391, p. 507, XP055300696, Oct. 16, 1975.

Pursley et al., "Bounds on aperiodic cross-correlation for binary sequences", Electronics Letters, (19760000), vol. 12, No. 12, pp. 304-305, Jun. 10, 1976.

Ketchum, "Decision Feedback Techniques for Interference Cancellation in PN Spread Spectrum Communication Systems", Military Communications Conference, 1984, MILCOM 1984, IEEE, Oct. 21-24, 1984.

Verdu, "Optimum Multiuser Asymptotic Efficiency", IEEE Transactions on Communications, (19860900), vol. COM-34, No. 9, doi:doi:10.1109/TCOM.1986.1096645, pp. 890-897, XP000674154, Sep. 1986.

Alberti et al., "Time-Domain Convolution of One-Bit Coded Radar Signals", IEE Proceedings—F, (19911000), vol. 138, No. 5, Oct. 1991.

Patel et al., "Analysis of a Simple Successive Interference Cancellation Scheme in a DS/CDMA System", IEEE Journal on Selected Areas in Communications, (19940000), vol. 12, No. 5, doi:doi:10.1109/49.298053, pp. 796-807, XP000464964, Jun. 1994.

Corazza, "On the MAX/TC Criterion for Code Acquisition and its Application to DS-SSMA Systems", IEEE Transactions on Communications, (19960900), vol. 44, No. 9, doi:doi:10.1109/26.536923, pp. 1173-1182, Sep. 1996.

Cox et al., "Secure spread spectrum watermarking for images, audio and video", Proceedings of 3rd IEEE International Conference on Image Processing, (19960000), vol. 3, doi:doi:10.1109/ICIP.1996.560429, pp. 243-246, XP010202376, Sep. 19, 1996.

Tirkel et al., "Image Watermarking—a Spread Spectrum Application", IEEE 4th International Symposium on Spread Spectrum Techniques and Applications Proceedings, (19960000), vol. 2, doi:doi:10.1109/ISSSTA.1996.563231, pp. 785-789, XP010208692, Sep. 25, 1996.

Hounam, et al., "A Technique for the identification and localization of SAR targets using encoding transponders", IEEE Transactions on Geoscience and Remote Sensing, (20010100). vol. 39, No. 1, doi:doi:10.1109/36.898660, pp. 3-7, XP001017565, Jan. 2001.

Wang et al., "Robust image watermark with wavelet transform and spread spectrum techniques", Conference Record of the Thirty-Fourth Asilomar Conference on Signals, Systems and Computers, (20000000), vol. 2, doi:doi:10.1109/ACSSC.2000.911307, pp. 1846-1850, XP010535316, Aug. 6, 2002.

D. V. Sarwate, "Comments on "Lower bounds on the Hamming auto- and cross correlations of frequency-hopping sequences"", IEEE Transactions on Information Theory Year, (20050000), vol. 51, No. 4, doi:doi:10.1109/TIT.2005.844055, p. 1615, XP011129072, Apr. 4, 2005.

Hounam et al., "A miniaturised coded SAR transponder for target tagging", Proceeding of $6^{th}$ European Conference on Synthetic Aperture Radar—EVSAR 2006, Dresden, May 2006.

Yang, et al., "Asymptotic Multiuser Efficiency of a Decorrelator Based Successive Interference Cancellation DS-CDMA Multiuser Receiver", in proceedings of 2006 Military Communications Conference, MILCOM, Oct. 23-25, 2006.

PCT International Search Report and Written Opinion dated May 30, 2018 for PCT Patent Application No. PCT/EP2018/055987.

* cited by examiner

INNOVATIVE LOCATOR SYSTEM, RELATED LOW POWER CONSUMPTION REGENERATIVE TRANSPONDER AND RELATED LOCALIZATION METHOD AND SERVICE

PRIORITY CLAIM

This application is a 35 U.S.C. § 371 national stage application of PCT/EP2018/055987, filed on Mar. 9, 2018, which claims priority from Italian Patent Application No. 102017000027029, filed on Mar. 10, 2017, and from European Patent Application No. 17202637.9, filed on Nov. 20, 2017. The entire disclosure of each of the aforementioned applications is incorporated by reference.

TECHNICAL FIELD OF THE INVENTION

The present invention relates to an innovative locator system employing a low power consumption, regenerative transponder, and to localization method and service implemented/provided by said locator system. More specifically, the localization method according to the present invention advantageously exploits a radar-based system, which may conveniently be an airborne/satellite Synthetic Aperture Radar (SAR), an Inverse Synthetic Aperture Radar (ISAR) system, a ground-based, naval/maritime, airborne or satellite radar system (e.g., a detection and search radar, an Air Traffic Control (ATC) radar, a weather radar, etc.).

STATE OF THE ART

Recently, more and more solutions have been proposed to locate, and to track locations of, people and/or objects. Many of these solutions are based on combined exploitation of a Global Navigation Satellite System (GNSS), such as the Global Positioning System (GPS), and of one or more wireless communication technologies, such as one or more mobile phone technologies (e.g., GSM, UMTS, LTE, etc.), and/or one or more short-range wireless communication technologies (e.g., Bluetooth), and/or one or more technologies for wireless local area networking (e.g., WiFi) and/or for wireless broadband access to telecommunications networks (e.g., WiMAX).

However, traditional localization devices and corresponding systems suffer from several disadvantages. For example, remote localization requires a considerable amount of power. Thus, battery life of a localization device is often limited. Furthermore, technology for long-range localization is expensive, and often requires sophisticated circuitry for operating. On the contrary, low-power options for localization devices are generally limited to cases in which another user equipment or network has to be present within a short distance from the localization device. Some known solutions rely on collaborative networks of users' mobile devices. For example, US 2016/0373894 A1 discloses systems and methods for locating a tracking device by exploiting the capabilities of a plurality of mobile devices associated with a community of users. In particular, a method according to US 2016/0373894 includes: associating, by a tracking system, a user with a tracking device, the tracking system being configured to store a status of the tracking device in a database; receiving, by the tracking system from the user, an indication that the tracking device is lost; setting, by the tracking system, a flag within the database indicating that the status of the tracking device is lost; receiving, by the tracking system, a location from a mobile device associated with a second user in response to the mobile device receiving a signal from the tracking device, the location comprising a location of the mobile device; in response to receiving the location, querying, by the tracking system, the database to determine the status of the tracking device; and, in response to the status of the tracking device being lost, providing the location to a user device associated with the user, the user device being configured to display the location of the mobile device and an indication of a distance between the mobile device and the tracking device.

Search and rescue devices exploiting GPS and one or more satellite communication networks are also known. These devices provide a very reliable service, but are generally bulky and power-hungry devices.

Additionally, mainly in the military sector, airborne and satellite radar systems, in particular SAR systems, are also used for localization/tracking purposes and for transmission of specific information, such as data related to Identification of Friend or Foe (IFF) and/or danger/emergency-related information items. In particular, radar transponders are typically used for this purpose, which, in use, receive radar/SAR-generated chirps, amplify the received chirps and retransmit the amplified chirps towards the radar/SAR. Typically, these radar transponders, in order to be identified and located, transmit signals with a power that is largely higher than (e.g., 30 dB over) background (clutter) backscatter power level, thereby causing dazzling dots in SAR images; in fact, there is no way for said radar transponders to be identified and located other than increasing the retransmitted power over background (clutter) backscatter power level. Typically, these radar transponders are simple, require non-negligible power and are large-sized devices.

This kind of radar/SAR-based localization technologies is well known in the patent literature. For example, in this respect, reference can be made to:

DE 33 15 499 A1, which discloses a method for generating an artificial backscatter target pattern in the imaging of a SAR by means of an electronic circuit in a transponder arranged in the target area of the SAR; wherein pulses coming from the SAR are received by the transponder and are split in the electronic circuit, as determined by electronic commands, into such a number of individual components which can be modulated individually or in aggregate in accordance with amount and phase, so as to generate a geometric target pattern in the imaging of the SAR after having been delayed in time, summed, amplified and sent back to the SAR; the space frequencies of this target pattern enable the amplitude and phase transfer function of the SAR to be analyzed, or natural and artificial backscatter signatures to be identified by way of comparison by means of a raster graduated in accordance with backscatter cross-section and degree of coherence;

U.S. Pat. No. 5,486,830 A, which discloses an active, phase-coded, time-grating transponder and a SAR and signal processor means that, in combination, allow the recognition and location of the transponder (tag) in the SAR image and allow communication of information messages from the transponder to the SAR; wherein the SAR is an illuminating radar having special processing modifications in an image-formation processor to receive an echo from a remote transponder, after the transponder receives and retransmits the SAR illuminations, and to enhance the transponder's echo relative to surrounding ground clutter by recognizing special transponder modulations from the transponder retransmissions; the remote tag also transmits information to the SAR through a single antenna that also serves to receive the SAR illuminations; unique tag-modulation and SAR signal processing techniques, in combination, allow the detection and precise geographical location of the tag through the reduction of interfering signals from ground clutter, and allow environmental and status information to be communicated from said tag to said SAR;

U.S. Pat. No. 5,767,802 A, which discloses an IFF system including an interferometric ultra-high resolution SAR located on an aircraft and a respective transponder located on one or more ground targets which may be, for example, ground vehicles; wherein each transponder is responsive to radiofrequency (RF) pulses transmitted from the SAR and includes means for generating an identification code which then modulates the radar return with a coded signal indicative of the target's identity (ID); upon receiving the signal from the transponder, the SAR processes the signals in an interferometric moving target focusing (IMTF) mode and a high-resolution SAR processing mode to provide signals indicative of both moving and fixed targets with ID data superimposed thereon; target ID extraction apparatus also having the same identification code applied thereto is included in the radar signal processor and extracts the target ID by a correlation technique which is then displayed along with the radar image of the target in question;

U.S. Pat. No. 5,821,895 A, which discloses a method and device for locating and identifying objects by using an encoding transponder in combination with the use of a SAR device carried by an aircraft/spacecraft; wherein signals transmitted by the SAR device are received by the transponder, are provided with an additional dominant signal structure and subsequently retransmitted back to the SAR device; once the modulated code sequence is known, a signal correlation can be carried out between the signals output by the transponder and the signal reflected from the environment;

U.S. Pat. No. 6,081,222 A, which discloses a radar transponder and transponder system for providing transponder communications signals embedded within radar interrogation and reply signals; wherein the radar interrogation signals include transponder interrogation signals embedded within the bandwidth thereof; the transponders include a receiver for extracting the transponder interrogation signal and an offset frequency generator for up-converting or down-converting the transponder interrogation signal while remaining within the bandwidth of the radar signal; the transponders may be selectively enabled in response to interrogation signals having particular frequencies and/or in accordance with preset date or time schedules; the transponder outputs may be phase coherent with the interrogation signals and generated less than 10 ns after receipt of the transponder interrogation signal; as such, the transponder reply signals are difficult to distinguish from the radar interrogation/reply signals;

U.S. Pat. No. 6,577,266 B1, which discloses a radar/tag system where pulses from a radar cause a tag (or transponder) to respond to the radar; wherein the radar, along with its conventional pulse transmissions, sends a reference signal to the tag; the tag recovers the reference signal and uses it to shift the center frequency of the received radar pulse to a different frequency; this shift causes the frequencies of the tag response pulses to be disjoint from those of the transmit pulse; in this way, radar clutter can be eliminated from the tag responses; the radar predicts, to within a small Doppler offset, the center frequency of tag response pulses; the radar can create synthetic-aperture-radar-like images and moving-target-indicator-radar-like maps containing the signature of the tag against a background of thermal noise and greatly attenuated radar clutter; the radar can geolocate the tag precisely and accurately (to within better than one meter of error); the tag can encode status and environmental data onto its response pulses, and the radar can receive and decode this information;

U.S. Pat. No. 6,329,944 B1, which discloses a method of communicating to a RF tag having a low power mode and a scan mode with a radar and an interrogator; wherein the method comprises the steps of alternating the RF tag between the low power mode and the scan mode and then transmitting a wake-up call to the RF tag by the radar; the wake-up call from the radar is received by the RF tag when the latter is in the scan mode; once the wake-up call has been received, the radar will transmit a downlink message to the RF tag; upon receipt of the downlink message, the RF tag will send an uplink message to the radar; after the uplink message has been sent to the radar, the RF tag will return to the low power mode; by alternating the RF tag between the low power mode and the scan mode, the power consumption of the RF tag is reduced thereby increasing the battery life thereof;

US 2004/0178944 A1, which discloses an RFID system using encoded digital information utilizing pulsed linear frequency modulation (LFM); wherein the LFM waveform is sent from an aircraft or satellite and is received by a transponder; the LFM waveform is demodulated using both, an AM and an FM receiver; the demodulated data is compared to preprogrammed criteria tables, and after validation is decoded and utilized; algorithms in the transponder are used to determine the frequency deviation and for calculating the direction of the slope of the LFM input signal; the valid RF signal is stored in a delay element, encoded with the transponder data using phase modulation (PM), and frequency modulation (FM); the tag transmission is synchronized to the input LFM waveform; the transmit/receive chopping signal prevents unwanted oscillations and is capable of randomization;

U.S. Pat. No. 7,030,805 B2, which discloses methods and systems that reduce clutter interference in a radar-responsive tag system; wherein a radar transmits a series of linear-frequency-modulated pulses and receives echo pulses from nearby terrain and from radar-responsive tags that may be in the imaged scene; tags in the vicinity of the radar are activated by the radar's pulses; the tags receive and re-modulate the radar pulses; tag processing reverses the direction, in time, of the received waveform's linear frequency modulation; the tag retransmits the re-modulated pulses; the radar uses a reversed-chirp de-ramp pulse to process the tag's echo; this solution applies to radar systems compatible with coherent gain-block tags, and is aimed at reducing strength of residual clutter echoes on each and every echo pulse received by the radar;

WO 2007/148199 A2, which discloses a target identification method for a SAR system monitoring an area containing at least one moving target; wherein the target is equipped with an identification device, which receives the radar signal transmitted by the radar system, and transmits a processed radar signal obtained by modulating the incoming radar signal with a modulating signal containing target information, such as identification and status information, and by amplifying the modulated radar signal; the radar echo signal reflected by the monitored area and containing the processed radar signal is received and processed by a control station of the radar system to locate the target on a map of the monitored area, and to extract the target information to identify the target;

U.S. Pat. No. 8,384,582 B2, which discloses an active transponder, particularly for SAR systems, comprising: a receiving antenna for receiving a first RF signal modulated according to a first train of one or more first pulses; separating means comprising two outputs at each one of which it outputs the first RF signal; second processing means connected to a first output of the separating means and capable to generate at least one code synchronized with the first pulses; signal generating means connected to a second output of the separating means and to the second processing means, and capable to generate a second RF signal modulated by said at least one code generated by the second processing means; and a transmitting antenna means capable to transmit the second RF signal; characterized in that the second processing means is capable to generate, for each one of the first pulses, a sequence of one or more second pulses, said at least one code being synchronized with the second pulses.

In view of the foregoing, radar/SAR-based localization of a transponder/tag is a well-known solution nowadays, as well as the related possibility of conveying information (for example, further reference can be made also to D. Hounam and K.-H. Wagel, "*A technique for the identification and localization of SAR targets using encoding transponders*", IEEE Transactions on Geoscience and Remote Sensing, Vol. 39, No. 1, January 2001, pages 3-7).

Furthermore, attempts have also been made to miniaturize the transponder devices (in this respect, reference can be made, for example, to D. Hounam et al., "*A miniaturised coded SAR transponder for target tagging*", Proceedings of the 6th European Conference on Synthetic Aperture Radar—EUSAR 2006, Dresden, May 2006).

OBJECT AND SUMMARY OF THE INVENTION

Object of the present invention is that of alleviating, at least in part, the drawbacks of the current radar/SAR-based localization/tracking technologies.

This and other objects are achieved by the present invention in that it relates to a localization method, a locator system, a radar system, a SAR system, an ISAR system and a locator transponder, as defined in the appended claims.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

Figure 1:
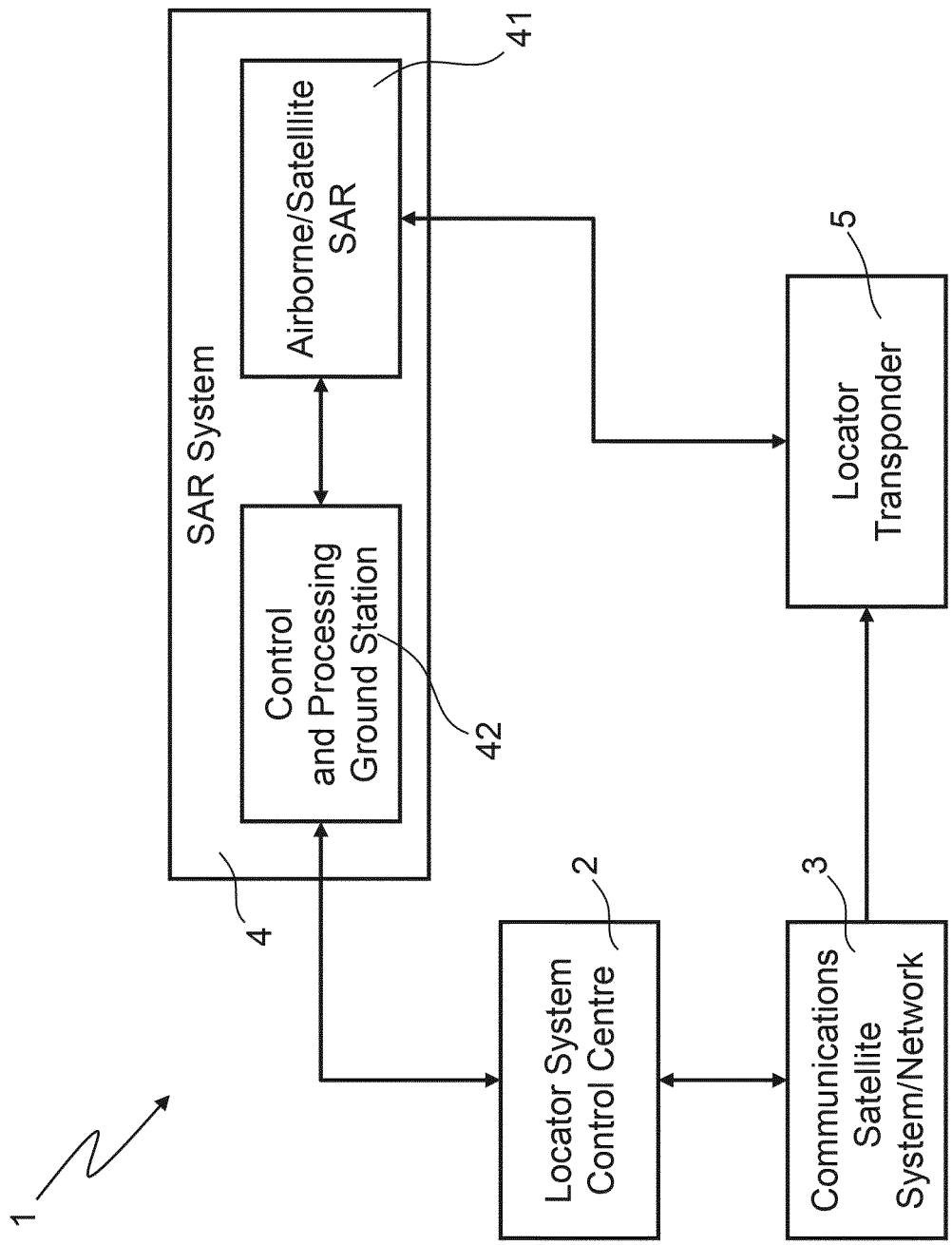
FIG. 1 schematically illustrates a first locator system according to a first preferred, non-limiting embodiment of the present invention.

The present invention concerns a localization method for locating a target that is coupled with a locator transponder associated with a permanent identification code permanently assigned to said locator transponder.

In particular, the localization method comprises:

a) upon reception of a user request for locating the target, transmitting, by a paging system or a radar-based system, a spread spectrum paging signal carrying the permanent identification code and a temporary identification code temporarily assigned to the locator transponder, wherein said temporary identification code is shorter than said permanent identification code;

b) receiving, by the locator transponder, the spread spectrum paging signal and extracting, by said locator transponder, the temporary identification code carried by said spread spectrum paging signal received;

c) transmitting, by the radar-based system, radar signals towards one or more areas of earth's surface or sky, and receiving, by said radar-based system, echo signals from said one or more areas of the earth's surface or of the sky;

d) upon reception by the locator transponder of one or more radar signals transmitted by the radar-based system, generating and transmitting, by said locator transponder, a sequence of watermarked radar echo signals in which a spread spectrum watermarking signal is embedded, wherein said spread spectrum watermarking signal carries the temporary identification code extracted.

More in detail, generating and transmitting, by the locator transponder, the sequence of watermarked radar echo signals includes:

generating a sequence of radar echo signals on the basis of the radar signal(s) received;

modulating the generated sequence of radar echo signals on the basis of the spread spectrum watermarking signal, thereby obtaining the sequence of watermarked radar echo signals; and transmitting said sequence of watermarked radar echo signals.

The spread spectrum watermarking signal includes a synchronization portion and an information portion. The synchronization portion of the spread spectrum watermarking signal is generated on the basis of a first predefined pseudo noise code. The information portion of the spread spectrum watermarking signal is generated by applying a first predefined spread spectrum technique to a given signal carrying the temporary identification code extracted. Said first predefined spread spectrum technique is applied by using a second predefined pseudo noise code, that is the same as, or different than, the first predefined pseudo noise code.

Moreover, the localization method according to the present invention further comprises:

e) carrying out, by the radar-based system, localization operations that include detecting, in the received echo signals, the sequence of watermarked radar echo signals transmitted by the locator transponder by detecting the synchronization portion of the spread spectrum watermarking signal embedded in said sequence of watermarked radar echo signals, extracting the temporary identification code carried by the spread spectrum watermarking signal embedded in the sequence of watermarked radar echo signals detected by extracting said temporary identification code from the information portion of the spread spectrum watermarking signal embedded in said sequence of watermarked radar echo signals detected, and determining a location of the locator transponder on the basis of the sequence of watermarked radar echo signals detected.

Conveniently, the spread spectrum paging signal includes a first portion followed by a second portion, wherein:

the first portion of the spread spectrum paging signal is generated by applying a second predefined spread spectrum technique to the permanent identification code;

said second predefined spread spectrum technique is applied by using a third predefined pseudo noise code;

the second portion of the spread spectrum paging signal is generated by applying a third predefined spread spectrum technique to the temporary identification code, said third predefined spread spectrum technique being the same as, or different than, the second predefined spread spectrum technique; and said third predefined spread spectrum technique is applied by using a fourth predefined pseudo noise code, that is the same as, or different than, the third predefined pseudo noise code.

The spread spectrum paging signal may conveniently carry also redundancy bits of an Error Detection And Correction (EDAC) code.

Conveniently, modulating the generated sequence of radar echo signals includes phase modulating said generated sequence of radar echo signals on the basis of the spread spectrum watermarking signal.

Preferably, the given signal includes a temporary-identification-code-related portion followed by an error detection portion, wherein said temporary-identification-code-related portion carries the temporary identification code and said error detection portion carries an error detection code computed on the basis of the temporary identification code.

More preferably, the temporary identification code is encoded in the temporary-identification-code-related portion of the given signal by using an error correction technique.

Conveniently, the radar-based system is a radar system or a Synthetic Aperture Radar (SAR) system or an Inverse Synthetic Aperture Radar (ISAR) system.

More conveniently, the localization operations carried out by the radar-based system further include forming a radar/SAR/ISAR image on the basis of the received echo signals; moreover, determining a location of the locator transponder includes determining a location of the locator transponder in the formed radar/SAR/ISAR image on the basis of the sequence of watermarked radar echo signals detected.

In particular, forming a radar/SAR/ISAR image on the basis of the received echo signals conveniently includes:

removing, from the received echo signals, the sequence of watermarked radar echo signals detected, thereby obtaining watermark-free echo signals; and forming a watermark-free radar/SAR/ISAR image on the basis of the watermark-free echo signals.

In detail, the sequence of watermarked radar echo signals detected may be conveniently removed from the received echo signals by using a multiuser detection technique.

Conveniently, the paging system may be a communications satellite system/network, or the radar-based system itself, or an ad hoc paging system that is specifically designed and dedicated to locator transponder activation and that is integrated into the radar-based system or distinct therefrom.

The present invention relates also to a locator system specifically designed and configured to carry out the above localization method, and to a locator transponder specifically designed and configured to carry out the steps b) and d) of said localization method.

Preferably, said locator transponder is configured to operate in:

an idle mode in which only first means of said locator transponder are on, said first means being configured to receive spread spectrum paging signals, and checking whether a received spread spectrum paging signal carries the permanent identification code associated with said locator transponder; and a localization mode in which also second means of said locator transponder are on, said second means being configured to extract the temporary identification code carried by a received spread spectrum paging signal carrying the permanent identification code associated with said locator transponder, and carry out the step d) of said localization method.

Moreover, the locator transponder is preferably configured to switch from the idle mode to the localization mode when the first means detect a received spread spectrum paging signal carrying the permanent identification code associated with said locator transponder.

Conveniently, the locator transponder is further configured to switch from the localization mode to the idle mode after a predefined time of operation in the localization mode, and/or upon reception of a radiofrequency signal carrying a predefined command.

Conveniently, the locator transponder may be designed to carry out, in the idle mode, a power harvesting mechanism to collect/harvest power received from the radar/SAR/ISAR system(s) and, for example, to use the collected/harvested power for battery recharge and/or other additional functions.

For a better understanding of the present invention, preferred embodiments thereof will be described in detail in the following paragraphs.

1. SAR-Based Embodiments of the Present Invention

FIG. 1 schematically illustrates a first locator system (denoted as a whole by 1) according to a first preferred, non-limiting embodiment of the present invention.

The first locator system 1 is designed to provide an on demand localization service to locate a target (such as an object, a vehicle, a vessel, a person, an animal, etc.) upon request of a user interested in knowing target's location.

In other words, the first locator system 1 is configured to, in response to a user request for locating a target, carry out a localization method to determine the position of the target.

As shown in FIG. 1, the first locator system 1 includes: a locator system control centre 2, a communications satellite system or network 3, a SAR system 4 and a locator transponder 5.

The locator transponder 5 is coupled with a target (not shown in FIG. 1) to be located in response to a user request and is associated with a permanent identification code, that univocally and permanently identifies said locator transponder 5 and that is conveniently stored on an internal memory of said locator transponder 5.

The SAR system 4 comprises an airborne/satellite SAR 41 (i.e., a SAR sensor installed on board an aircraft/drone/UAV (i.e., Unmanned Aerial Vehicle) or a satellite) and a control and processing ground station 42, that are wirelessly and remotely connected to each other to allow transmission of control commands from the control and processing ground station 42 to the airborne/satellite SAR and of telemetry and remotely sensed data from said airborne/satellite SAR 41 to said control and processing ground station 42.

The locator system control centre 2 is connected to the communications satellite system/network 3 and to the control and processing ground station 42 of the SAR system 4.

Figure 2:
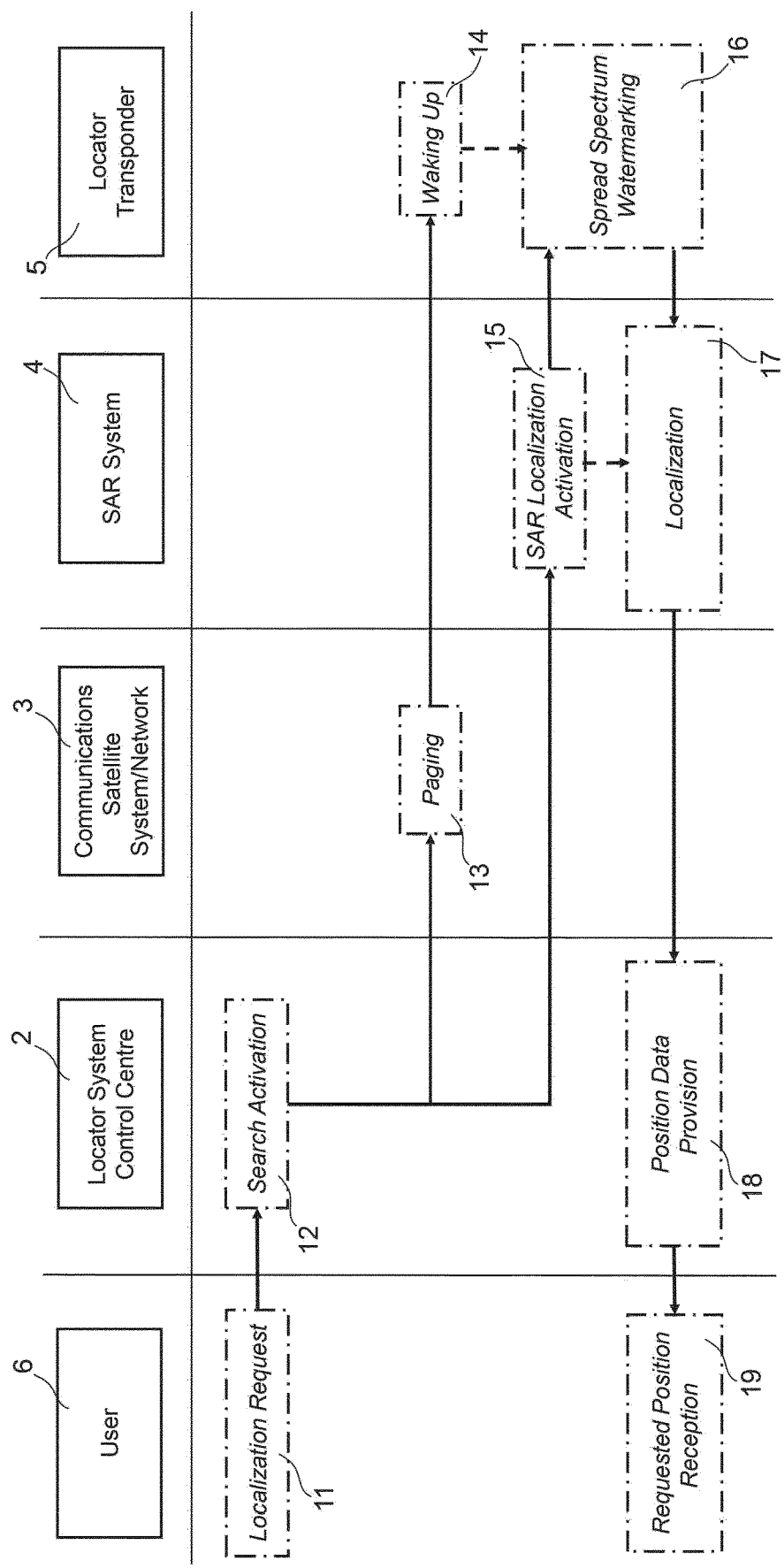
FIG. 2 schematically illustrates a preferred, non-limiting embodiment of a localization method performed, in use, by the first locator system of FIG. 1.

FIG. 2 schematically illustrates a preferred, non-limiting embodiment of a localization method performed, in use, by the first locator system 1.

In particular, in response to a localization request (block 11 in FIG. 2) received from a user 6 (for example, via a website of the first locator system 1), the locator system control centre 2 activates a search for the locator transponder 5 (block 12 in FIG. 2) by:

assigning a temporary identification code to said locator transponder 5, wherein said temporary identification code is shorter than the permanent identification code; and sending a first search activation message to the communications satellite system/network 3 and a second search activation message to the SAR system 4 (in particular, to the control and processing ground station 42 thereof), wherein the first search activation message includes both the permanent and temporary identification codes of the locator transponder 5, while the second search activation message includes only the temporary identification code.

Conveniently, the permanent and temporary identification codes are, respectively, M-digit and N-digit numbers (for example, M-digit and N-digit binary, hexadecimal or decimal numbers), wherein M and N are positive integers with N smaller than M.

In particular, permanent identification code length is conveniently sized to allow allocation of an univocal permanent identification code to each locator transponder 5 belonging to the first locator system 1 (namely, the permanent identification codes are conveniently long enough to "cover" the whole "population" of locator transponders 5 of the first locator system 1). Instead, temporary identification code length is conveniently sized to allow allocation of an univocal temporary identification code to each locator transponder 5 to be located at a given time; therefore, on the assumption that only few (i.e., a limited number of) locator transponders 5 are to be located at the same time, the temporary identification code length can be extremely smaller than the permanent identification code length (e.g., a 3-bit temporary identification code is sufficient to locate up to eight locator transponders 5 at the same time). Anyway, if necessary, the temporary identification code may be conveniently concatenated in length so as to allow localization of a wider community of locator transponders 5.

Getting back to the localization method performed by the first locator system 1 (and, hence, again with reference to FIG. 2), the communications satellite system/network 3, upon reception of the first search activation message, carries out a paging step (block 13 in FIG. 2), that includes transmitting a spread spectrum paging signal carrying the permanent and temporary identification codes of the locator transponder 5.

Advantageously, the spread spectrum paging signal transmitted by the communications satellite system/network is a very low data rate signal that, as in deep space communications, can endure an extremely poor link budget and exploit very slow receiving circuits thereby enabling very low power consumption by the locator transponder 5. All other existing solutions rely on much faster detection, transmission and processing needs.

Preferably, the spread spectrum paging signal includes a first portion followed by a second portion, wherein:

the first portion is
intended to enable the locator transponder 5, at reception side, to detect the permanent identification code and synchronize with said spread spectrum paging signal, and generated by applying a first predefined spread spectrum technique (such as a direct-sequence spread spectrum (DSSS) technique) to the permanent identification code, wherein said first predefined spread spectrum technique is applied by using a first predefined Pseudo Noise (PN) code (such as a Barker code, a Gold code, a Kasami code, etc.); and the second portion is generated by applying a second predefined spread spectrum technique (such as a DSSS technique) to the temporary identification code, wherein said second predefined spread spectrum technique is applied by using a second predefined PN code (such as a Barker code, a Gold code, a Kasami code, etc.).

Conveniently, said first and second predefined spread spectrum techniques may be the same as, or different than, one another; moreover, said first and second predefined PN codes may be conveniently the same as, or different than, one another.

Conveniently, the first and second predefined PN codes used to generate the spread spectrum paging signal can be selected from sufficiently broad sets of PN codes with good cross- and auto-correlation properties, such those used for Code Division Multiple Access (CDMA).

The locator transponder 5 is designed to operate in an idle mode and in a localization mode. In particular, the locator transponder 5 is configured to operate by default in the idle mode, in which said locator transponder 5 performs, at least periodically, only functions for spread spectrum paging signal receiving and processing to check presence of its permanent identification code in spread spectrum paging signals received. Therefore, in the idle mode only components/units/modules of said locator transponder 5 for spread spectrum paging signal receiving and processing are operated (at least periodically), while all other components/units/modules are off, thereby resulting in the locator transponder 5 having, in the idle mode, an extremely low power consumption. Conveniently, the locator transponder 5 may be designed to carry out, in the idle mode, a power harvesting mechanism to collect/harvest power received from the SAR system 4 and, for example, to use the collected/harvested power for battery recharge and/or other additional functions.

Again with reference to FIG. 2, the locator transponder 5, upon reception of a spread spectrum paging signal carrying its permanent identification code, awakes (block 14 in FIG. 2) and starts operating in the localization mode, in which said locator transponder 5 cooperates with the SAR system 4 to allow the latter to determine the position of said locator transponder 5.

In particular, upon reception of a spread spectrum paging signal carrying its permanent identification code, the locator transponder 5 extracts the temporary identification code carried by said spread spectrum paging signal received, which temporary identification code is then used to allow the SAR system 4 to determine the position of said locator transponder 5.

In fact, upon reception of the second search activation message, the SAR system 4 activates SAR localization (block in FIG. 2) for locating the locator transponder 5 associated with the temporary identification code contained in the second search activation message received.

The SAR localization activation (block 15 in FIG. 2) does not affect normal operation in transmission and reception of the airborne/satellite SAR 41. In fact, after the SAR localization activation (block 15 in FIG. 2), the airborne/satellite SAR 41 continues operating according to its predefined operating mode (e.g., Stripmap, Spotlight, etc.) by transmitting radar signals towards, and receiving echo signals from, one ore more target areas of the earth's surface. Instead, as it will be described in the following, after the SAR localization activation (block 15 in FIG. 2) the control and processing ground station 42 starts carrying out a specific processing (block 17 in FIG. 2) of the echo signals received by the airborne/satellite SAR 41, by handling the localization of the locator transponder 5 differently from the traditional SAR image generation.

Upon reception of one or more radar signals transmitted by the airborne/satellite SAR 41, the locator transponder 5 (that is operating in the localization mode) performs a spread spectrum watermarking step (block 16 in FIG. 2), that includes generating and transmitting a sequence of watermarked radar echo signals in which a spread spectrum watermarking signal is embedded, wherein said spread spectrum watermarking signal carries the temporary identification code of said locator transponder 5 (in particular, the temporary identification code extracted by said locator transponder 5 from the spread spectrum paging signal received from the communications satellite system/network 3).

Preferably, generating and transmitting a sequence of watermarked radar echo signals includes:
generating a sequence of radar echo signals on the basis of the one or more radar signals received by the locator transponder 5 from the airborne/satellite SAR 41;
modulating (more preferably, phase modulating) the generated sequence of radar echo signals on the basis of the spread spectrum watermarking signal, thereby obtaining the sequence of watermarked radar echo signals; and
transmitting said sequence of watermarked radar echo signals.

Preferably, the spread spectrum watermarking signal includes a synchronization portion and an information portion, wherein the synchronization portion is followed by the information portion or, alternatively, the synchronization and information portions are superimposed in time, and wherein:
the synchronization portion is
intended to enable the SAR system 4, at reception side, to detect, and synchronize with, said spread spectrum watermarking signal, and
generated by the locator transponder 5 on the basis of a third predefined PN code (such as a Barker code, a Gold code, a Kasami code, etc.); and
the information portion is generated by the locator transponder 5 by applying a third predefined spread spectrum technique (such as a DSSS technique) to a given signal carrying the temporary identification code, wherein said third predefined spread spectrum technique is applied by using a fourth predefined PN code (such as a Barker code, a Gold code, a Kasami code, etc.).

Conveniently, said third and fourth predefined PN codes may be the same as, or different than, one another.

As already explained, conveniently, according to some specific embodiments, the synchronization and information portions may be coincident in time.

Preferably, in order to increase robustness of information decoding and of error detection and correction at reception side, the given signal includes a temporary-identification-code-related portion followed by an error detection portion, wherein:
the temporary-identification-code-related portion carries the temporary identification code; and
the error detection portion carries an error detection code (such as a Cyclic Redundancy Check (CRC) code or another type of integrity/parity check code) computed on the basis of the temporary identification code.

For example, the temporary identification code can be conveniently an N-bit code and the error detection code can be conveniently a P-bit code, wherein N and P are positive integers with P smaller than N. In this case, the given signal may be conveniently formed by N+P time-contiguous rectangular pulses, all having one and the same predefined duration $T_B$, wherein:
each of the first N rectangular pulses (forming the temporary-identification-code-related portion of said given signal) carries a respective bit of the temporary identification code by assuming an amplitude equal to +1 or −1 depending on whether the respective bit to be carried is 1 or 0, respectively; and
each of the following P rectangular pulses (forming the error detection portion of said given signal) carries a respective bit of the error detection code, also in this case by assuming an amplitude equal to +1 or −1 depending on whether the respective bit to be carried is 1 or 0, respectively.

Moreover, again according to this example, the information portion of the spread spectrum watermarking signal may be conveniently generated by applying, to said given signal, a DSSS technique based on a predefined PN code including $L=2^N-1$ chips of +1 or −1 amplitude, wherein all the chips have one and the same predefined duration $T_C=T_B/L$.

Figure 3:
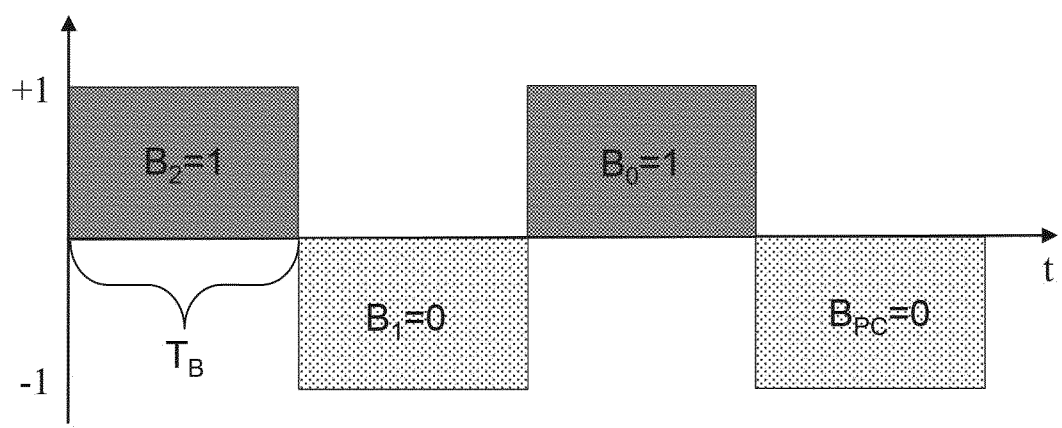
FIG. 3 schematically illustrates an example of generation of an information portion of a spread spectrum watermarking signal according to an aspect of the present invention.
Figure 3:
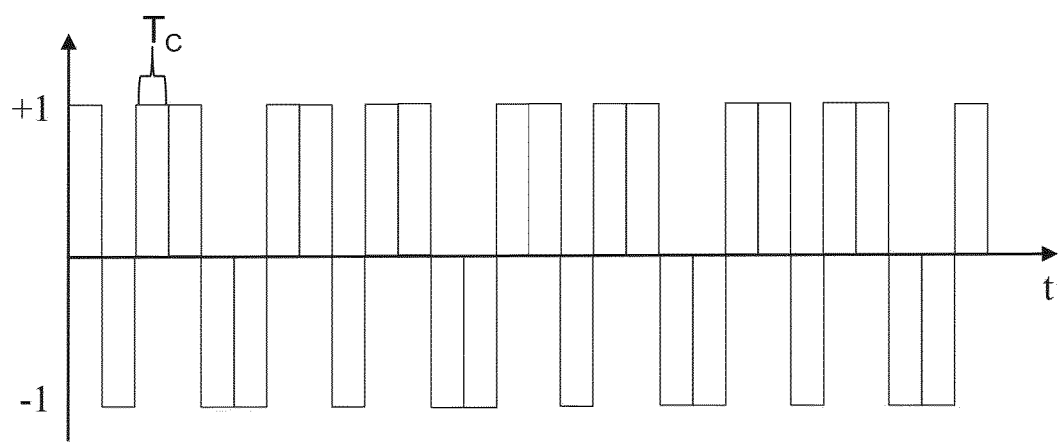
Figure 3:
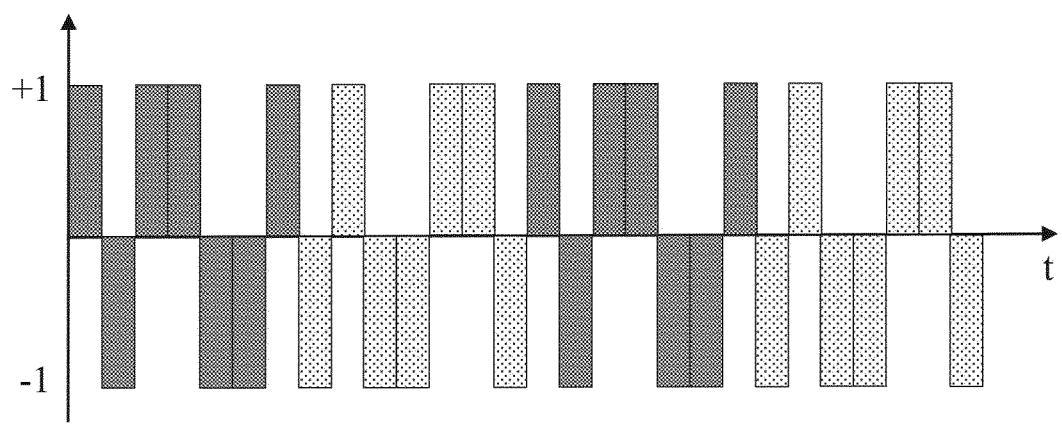

In this respect, FIG. 3 schematically illustrates an example in which:
- N=3 and the temporary identification code is [101], i.e., the three bits $B_2$, $B_1$ and $B_0$ of the temporary identification code are, respectively, 1, 0 and 1 (wherein $B_2$ is the Most Significant Bit (MSB) and $B_0$ is the Least Significant Bit (LSB));
- P=1, thereby resulting in the error detection code being a single parity check bit, in particular an even parity bit $B_{PC}$ computed as $$B_{PC} = \left(\sum_{i=0}^{2} B_i\right) \mod 2 = 0;$$

- L=7, thereby resulting in the PN code having seven chips, wherein the amplitudes of the chips are equal to [+1, −1, +1, +1, −1, −1, +1].

In particular, FIG. 3 shows three amplitude-time diagrams which, from the top to the bottom, are related to:
- the given signal carrying the three bits $B_2$, $B_1$ and $B_0$ of the temporary identification code and the parity check bit $B_{PC}$;
- the four replicas of the PN code used for direct-sequence spread spectrum (DSSS) modulation of the given signal; and
- the resulting information portion of the spread spectrum watermarking signal.

In order to further increase robustness of information decoding and of error detection and correction at reception side, the temporary identification code can be conveniently encoded in the temporary-identification-code-related portion of the given signal by using an error correction technique, conveniently a Forward Error Correction (FEC) technique, such as a FEC technique based on Reed-Muller codes or other types of error correction codes.

As is broadly known, digital watermarking techniques are used to hiddenly embed digital information in a signal, such as an audio, video or image data, typically for copyright protection purposes. In particular, several digital watermarking technologies exploiting spread spectrum techniques are known nowadays; in this respect, reference can be made, for example, to:
A. Z. Tirkel et al., "*Image Watermarking—a Spread Spectrum Application*", IEEE 4th International Symposium on Spread Spectrum Techniques and Applications Proceedings, 1996, Vol. 2, pages 785-789;
I. J. Cox et al., "*Secure spread spectrum watermarking for images, audio and video*", Proceedings of 3rd IEEE International Conference on Image Processing, 1996, Vol. 3, pages 243-246; and
Yu-Pin Wang et al., "*Robust image watermark with wavelet transform and spread spectrum techniques*", in Conference Record of the Thirty-Fourth Asilomar Conference on Signals, Systems and Computers, 2000, Vol. 2, pages 1846-1850.

However, the present invention advantageously exploits a spread spectrum watermarking technique in a context that is completely different with respect to prior art, namely in order to generate and transmit a sequence of watermarked radar echo signals which:

- have a power that is lower, in general, than background backscatter power level and, in particular, than clutter and noise power level; and
- convey the temporary identification code of a locator transponder 5 to be located by means of a hidden, albeit detectable, watermark.

Conveniently, several different technologies may be advantageously used to design the locator transponder 5 and several different techniques may be advantageously implemented by the locator transponder 5 to carry out the spread spectrum watermarking step (block 16 in FIG. 2).

For example, the locator transponder 5 may be either mostly analogic thereby not requiring analog-to-digital and digital-to-analog conversion means, or may use a one-bit analog-to-digital converter, or may be also more complex.

Figure 4:
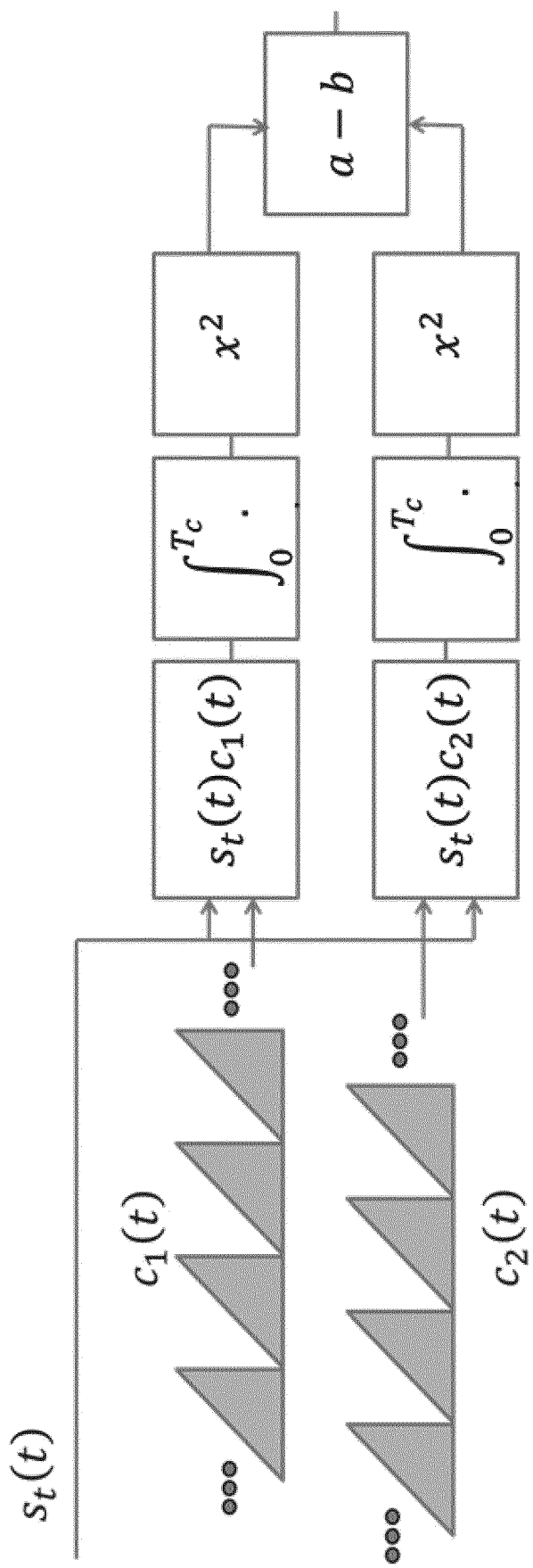
FIG. 4 schematically illustrates an example of early-late synchronization technique implementable by a locator transponder belonging to the first locator system of FIG. 1.

By selecting an analog implementation, the locator transponder 5 could, for example, carry out the following operations:
- receiving radar chirps transmitted by the airborne/satellite SAR 41;
- performing an early-late synchronization technique (for example, as schematically shown in FIG. 4, by multiplying a received radar chirp by a time-advanced chirp replica and a delayed chirp replica and by means of S-curve generation; in particular, in FIG. 4 $c_1(t)$ and $c_2(t)$ schematically represent frequency variation of one possible embodiment of chirp local replicas) to detect radar chirp presence and to synchronize with radar chirp timing; and,
- at each received radar chirp, generating and transmitting a corresponding watermarked radar echo signal.

Alternatively, the analog locator transponder 5 could conveniently generate and transmit all the sequence of watermarked radar echo signals upon reception of the first radar chirp.

More in general, the locator transponder 5 conveniently responds to the received radar chirps after having estimated the time of arrival of said received radar chirps. This operation can be conveniently carried out on a single shot (in fact, the radar chirps transmitted by the current SAR systems have enough power to allow estimation of time of arrival on a single shot), or by using a finite-state machine that minimizes false detection and missed detection probabilities.

More in detail, the sequence of watermarked radar echo signals may be conveniently generated and transmitted all together upon reception of a radar chirp, or in a fragmented way after each received radar chirp, depending on timing analyses typical of SAR, that take into account swath size, Pulse Repetition Frequency (PRF) and watermark sequence length. In the first case the watermark energy, in multiple phase-coded chirps identical to the one received from the SAR system 4 is concentrated around each received chirp; in the second case the watermark is fragmented around the epoch of reception of the multiple chirps.

Figure 5:
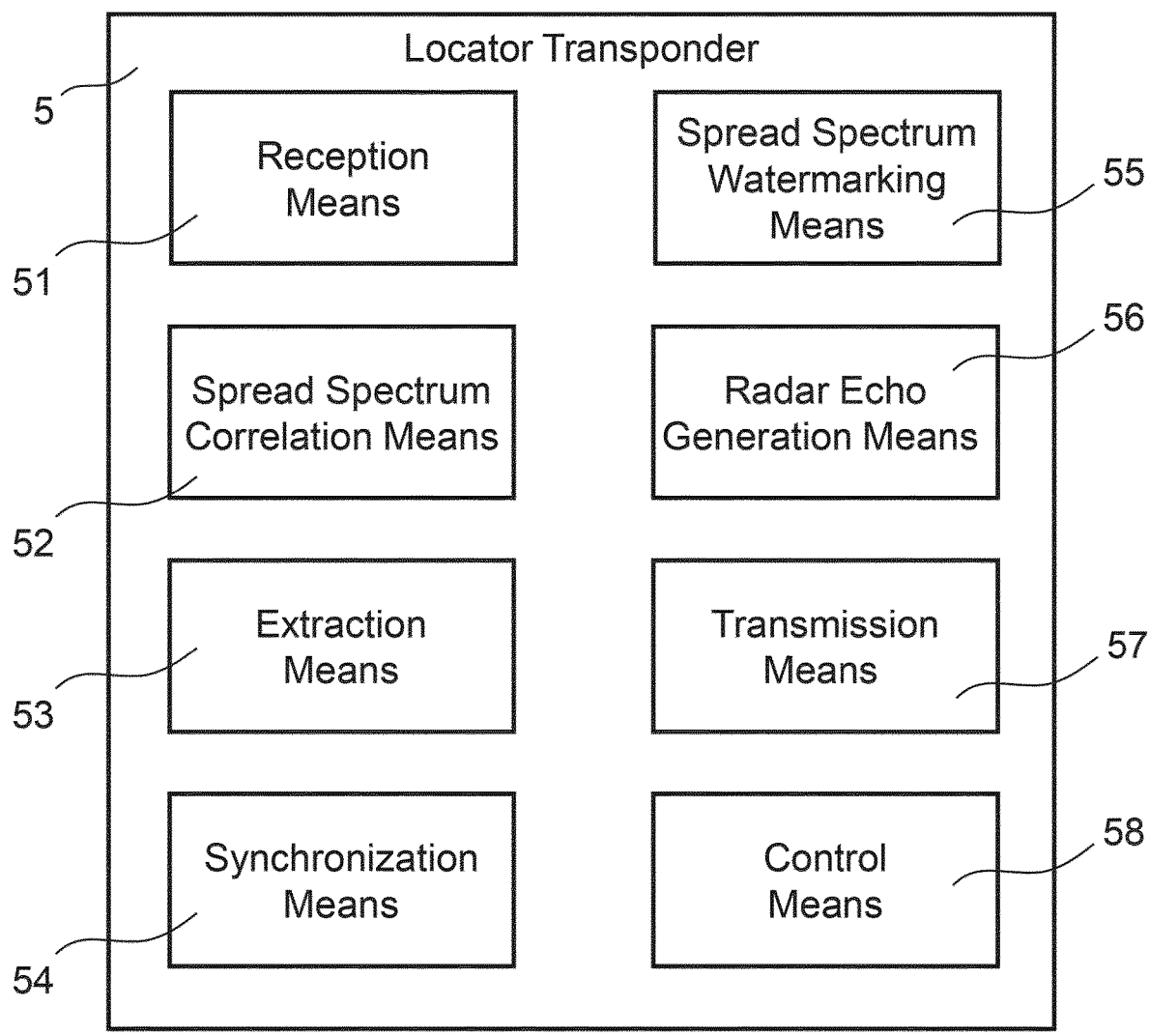
FIG. 5 schematically illustrates an example of functional architecture suitable for said locator transponder.

FIG. 5 schematically shows an example of functional architecture suitable for the locator transponder 5 (independently of its specific analogic or digital implementation chosen). In particular, as shown in FIG. 5, the locator transponder 5 can conveniently include:
- reception means 51 for receiving the spread spectrum paging signals transmitted by the communications satellite system/network 3 and the radar signals transmitted by the airborne/satellite SAR 41;

spread spectrum correlation means 52 for detecting the first portion of a received spread spectrum paging signal carrying the permanent identification code of the locator transponder 5;

extraction means 53 for extracting the temporary identification code from the second portion of a received spread spectrum paging signal carrying, in the first portion, the permanent identification code of the locator transponder 5;

synchronization means 54 for performing synchronization with the received radar signals;

spread spectrum watermarking means 55 for generating the spread spectrum watermarking signal;

radar echo generation means 56 for generating the sequence of watermarked radar echo signals to be transmitted;

transmission means 57 for transmitting the sequence of watermarked radar echo signals; and control means 58 for controlling operation of the locator transponder 5 and for causing said locator transponder 5 to operate, alternatively, in the idle mode or in the localization mode.

Additionally, the locator transponder 5 can be conveniently made as a coin- or medal-sized device provided with a patch antenna (such as a wideband notched patch antenna fed by a coaxial probe), or with a folded dipole antenna, or with a Planar Inverted Folded Antenna (PIFA).

The localization transponder 5 according to the present invention may advantageously maximize power efficiency of regenerative solutions, since it conveniently estimates, in a robust way, the time of arrival of the SAR signals and generates a novel signal with power below the clutter and thermal noise thanks to the use of spread spectrum signature sequences that form an invisible watermark hidden in the SAR image. In this respect, it is worth noting that the idea of a clutter-immersed watermark applied to a SAR image is completely new.

More in detail, the transmission of very long watermarked signals results in said watermarked signals being under the detection threshold and being detectable only via spread spectrum code synchronization.

The reduction of the size of the transmitting and receiving antenna of the locator transponder 5, and of the transmission power used by said locator transponder 5 (e.g., the latter may conveniently use a transmission power of 1 mW (milliWatt)) is obtained by advantageously exploiting the combination of spread spectrum processing gain concept and regeneration. In previous solutions, PN codes were used only to decouple the clutter on a single chirp basis, and not to improve gain on a multiple chirp train. Conveniently, for a fixed SAR PRF, the locator transponder localization swath may go well below the SAR imaging swath. For locator transponder 5 localization, blind ranges of monostatic SAR systems can be filtered out by the inherent robustness of the spread spectrum watermark of the locator transponder 5.

Getting back to the localization method performed by the first locator system 1 (and, hence, again with reference to FIG. 2), the SAR system 4 (in particular, the control and processing ground station 42), when SAR localization has been activated (block 15 in FIG. 2), performs a localization step (block 17 in FIG. 2), that includes:

detecting, in the echo signals received by the airborne/satellite SAR 41, the sequence of watermarked radar echo signals transmitted by the locator transponder 5;

extracting, from the sequence of watermarked radar echo signals detected, the temporary identification code of the locator transponder 5;

forming a SAR image on the basis of the echo signals received by the airborne/satellite SAR 41;

determining a location of the locator transponder 5 in the formed SAR image on the basis of the sequence of watermarked radar echo signals detected;

indicating the determined location of the locator transponder 5 in the formed SAR image;

computing coordinates of the locator transponder 5 on the basis of the formed SAR image and of the location of the locator transponder 5 in the formed SAR image (and, conveniently, also on the basis of a position and of pointing parameters of the airborne/satellite SAR 41 when the latter received the echo signals containing the sequence of watermarked radar echo signals transmitted by the locator transponder 5);

generating position data including the computed coordinates of the locator transponder 5 and, conveniently, also the formed SAR image in which the determined location of the locator transponder 5 is indicated; and providing the locator system control centre 2 with the generated position data.

Preferably, detecting, in the echo signals received by the airborne/satellite SAR 41, the sequence of watermarked radar echo signals transmitted by the locator transponder 5 includes detecting the synchronization portion of the spread spectrum watermarking signal embedded in said sequence of watermarked radar echo signals transmitted by the locator transponder 5.

Again preferably, extracting, from the sequence of watermarked radar echo signals detected, the temporary identification code of the locator transponder 5 includes extracting said temporary identification code from the information portion of the spread spectrum watermarking signal embedded in said sequence of watermarked radar echo signals detected.

Conveniently, the degree of probability with which the temporary identification code is not decoded can be made as small as desired, by increasing the FEC code and the spread spectrum processing gain (i.e., the ratio between the data rate and the chip rate). Instead, the degree of probability with which the temporary identification code integrity is verified (and an iterative decoding, with or without iteration stopping rule, can be started) is associated with the error detection code (e.g., CRC).

Conveniently, one and the same chirp matched filter may be used for both SAR image and localization processing.

Figure 6:
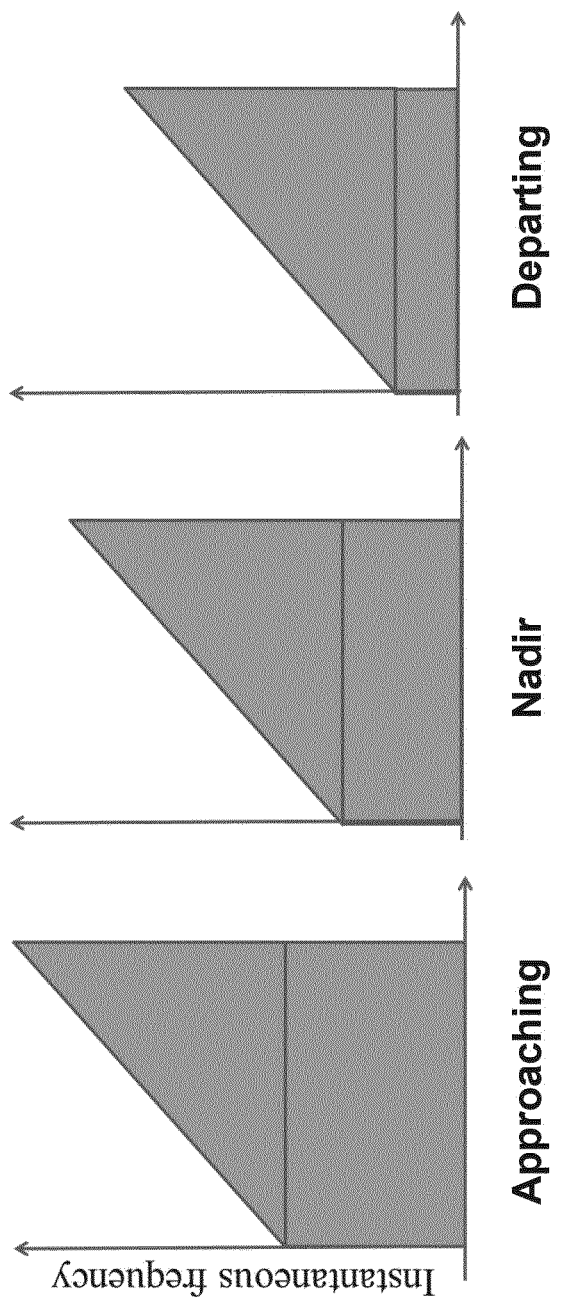
FIGS. 6 and 7 schematically illustrate examples of chirp frequency variation as affected by SAR motion Doppler and the resulting phase shift after chirp matched filtering with azimuth focusing (schematically simplified as for an ideally long time chirp duration) in a localization step of the localization method of FIG. 2.
Figure 7:
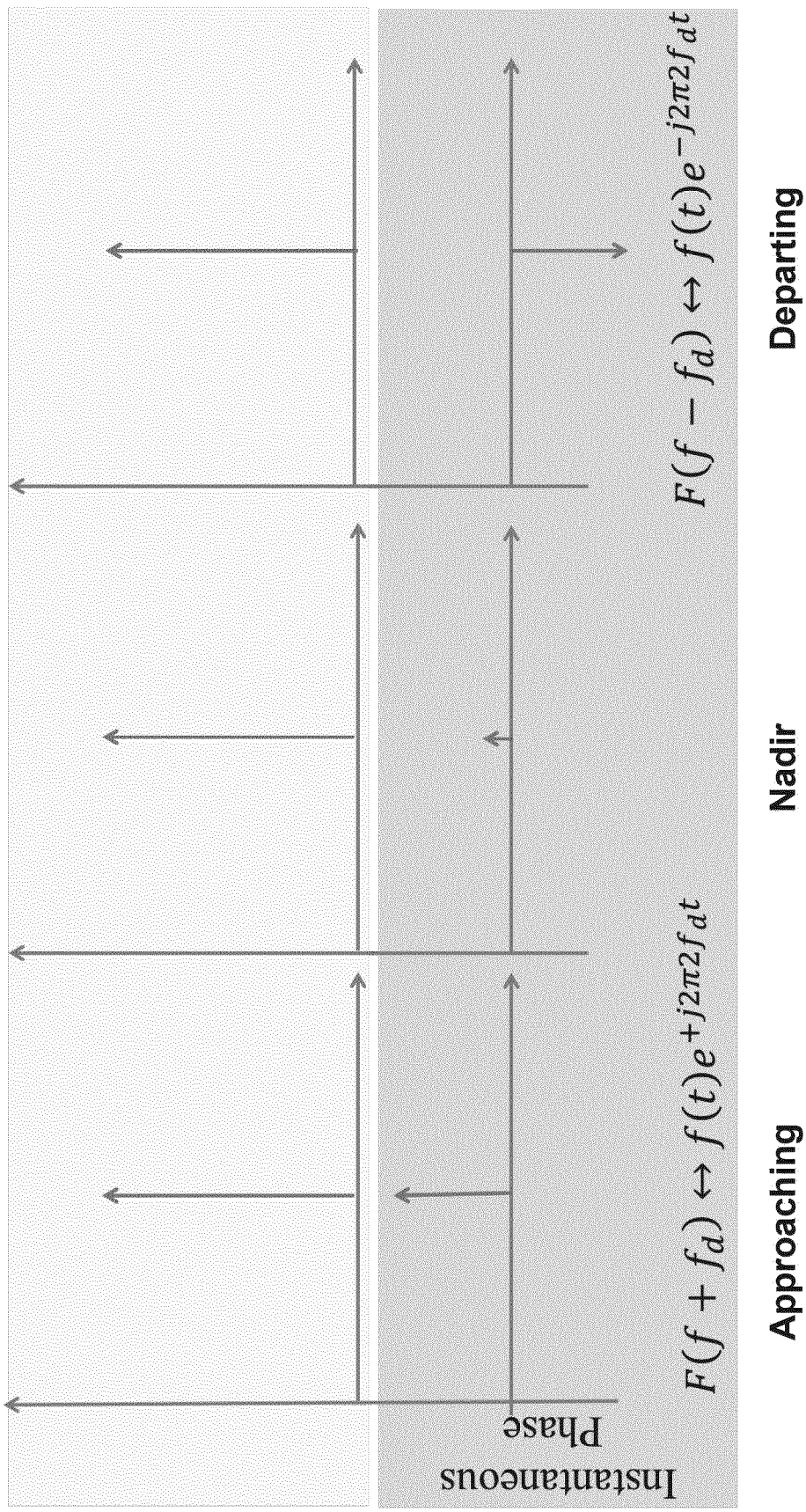

For a better understanding of the localization step (block 17 in FIG. 2), FIGS. 6 and 7 illustrate examples of, respectively, chirp frequency variation as affected by SAR motion Doppler and the resulting phase shift after chirp matched filtering with azimuth focusing (schematically simplified as for an ideally long time chirp duration) for a target located in:

a zone which the airborne/satellite SAR 41 is departing from;

a zone which is at nadir of the airborne/satellite SAR 41; and a zone which the airborne/satellite SAR 41 is approaching.

As shown, in a monostatic SAR the round trip doubles the single path Doppler denoted by $f_d$ in FIG. 7. A similar Doppler shift can be artificially imposed by the purposely designed phase coded spread spectrum watermark.

Preferably, forming a SAR image on the basis of the echo signals received by the airborne/satellite SAR 41 includes:

removing the sequence of watermarked radar echo signals detected from the echo signals received by the airborne/satellite SAR 41, thereby obtaining watermark-free echo signals; and forming a watermark-free SAR image on the basis of the watermark-free echo signals.

The use of PN codes reduces residual visibility of each individual chirp over the clutter while providing, for example, a 30 dB gain advantage when PN code matched filter is used by the imaging processor (residual visibility being the error in watermarked radar echo signals removal from the received echo signals).

Conveniently, the sequence of watermarked radar echo signals detected can be removed by means of a multiuser detection technique (similarly to mobile phone networks).

Conveniently, a technique based on MAX/TC criterion may be used to detect the PN code used by the locator transponder 5. In this respect, the teachings provided in G. E. Corazza, "*On the MAX/TC Criterion for Code Acquisition and its Application to DS-SSMA Systems*", IEEE Transactions on Communications, 44(9) September 1996, pages 1173-1182, may be advantageously exploited.

More in general, the present invention can advantageously exploit the teachings provided by:

M. B. Pursley, D. V. Sarwate, "*Bounds on aperiodic cross-correlation for binary sequences*", Electronics Letters, 1976, Vol. 12, No. 12, pages 304-305;

D. V. Sarwate, Comments on "*Lower bounds on the Hamming auto-and cross correlations of frequency-hopping sequences*" by D. Peng and P. Fan, IEEE Transactions on Information Theory Year, 2005, Vol. 51, No. 4, page 1615;

J. Lindner, "*Binary sequences up to length 40 with best possible autocorrelation function*", Electronics Letters, 1975, Vol. 11, No. 21, page 507;

R. Gold, "*Maximal recursive sequences with 3-valued recursive cross-correlation functions (Corresp.)*", IEEE Transactions on Information Theory, 1968, Vol. 14, No. 1, pages 154-156;

S. Golomb, R. Scholtz, "*Generalized Barker sequences*", IEEE Transactions on Information Theory, 1965, Vol. 11, No. 4, pages 533-537;

J. W. Ketchum, "*Decision Feedback Techniques for Interference Cancellation in PN Spread Spectrum Communication Systems*", Military Communications Conference, 1984, MILCOM 1984, IEEE;

S. Verdù, "*Optimum Multiuser Asymptotic Efficiency*", IEEE Transactions on Communications, Vol. COM-34, No. 9, September 1986, pages 890-897;

P. Patel, J. Holtzman, "*Analysis of a simple successive interference cancellation scheme in a DS/CDMA system*", IEEE Journal on Selected Areas in Communications, 1994, Vol. 12, No. 5, pages 796-807;

B. Yang, F. Danilo-Lemoine, "*Asymptotic Multiuser Efficiency of a Decorrelator Based Successive Interference Cancellation DS-CDMA Multiuser Receiver*", in proceedings of 2006 Military Communications Conference, MILCOM, 23-25 Oct. 2006;

G. Alberti et al., "*Time-domain convolution of one-bit coded radar signals*", IEE Proceedings-F, Vol. 138, No. 5, October 1991; and V. Pascazio et al., "*On the Role of Raw Data Oversampling in Signum Coded SAR Imaging*", Proceedings of the IEEE IGARSS '99 International Geoscience and Remote Sensing Symposium, 1999.

Figure 8:
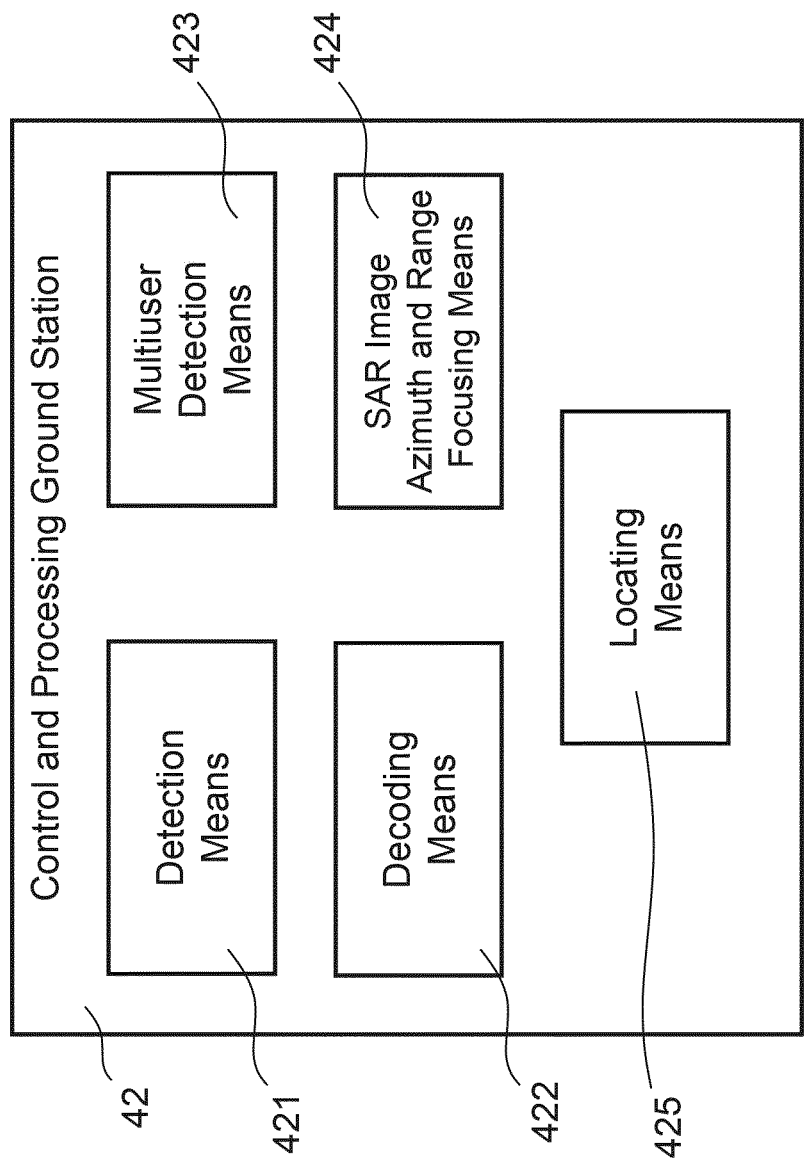
FIG. 8 schematically illustrates an example of functional architecture suitable for a control and processing ground station of a SAR system belonging to the first locator system of FIG. 1.

FIG. 8 schematically shows an example of functional architecture suitable for the control and processing ground station 42. In particular, as shown in FIG. 8, the control and processing ground station 42 can conveniently include:

detection means 421 for detecting (conveniently, by using a MAX/TC criterion or a similar one) the synchronization portion of the spread spectrum watermarking signal embedded in the sequence of watermarked radar echo signals transmitted by the locator transponder 5 and for synchronizing, in general, with said sequence of watermarked radar echo signals and, in particular, with said spread spectrum watermarking signal;

decoding means 422 for decoding the temporary identification code encoded in the information portion of the spread spectrum watermarking signal (according to an alternative embodiment, detection and decoding functions implemented by the detection and decoding means 421 an 422 can be conveniently carried out jointly and simultaneously by means of a detection and decoding joint algorithm);

multiuser detection means 423 for removing the sequence of watermarked radar echo signals from the echo signals received by the airborne/satellite SAR 41;

SAR image azimuth and range focusing means 424 for forming the SAR image; and locating means 425 for determining the location of the locator transponder 5 in the formed SAR image.

Getting back to the localization method performed by the first locator system 1 (and, hence, again with reference to FIG. 2), the locator system control centre 2, upon reception of the position data from the SAR system (in particular, from the control and processing ground station 42), provides the user 6 with said position data (block 18 in FIG. 2)—conveniently, after payment for the localization service by said user 6—and, hence, said user 6 receives the requested location (block 19 in FIG. 2).

Preferably, the locator transponder 5 is further configured to switch from the localization mode to the idle mode
- after a predefined time of operation in the localization mode, and/or
- upon reception of an RF signal carrying a predefined command and transmitted by the communications satellite system/network 3 or directly by the SAR system 4 (in particular, by the airborne/satellite SAR 41).

In fact, for example, after the locator system control centre 2 has received the position data from the SAR system 4 (in particular, from the control and processing ground station 42) or, alternatively, after it has provided the user 6 with said position data, said locator system control centre 2 may conveniently ask the communications satellite system/network 3 or the SAR system 4 (in particular, the control and processing ground station 42) to transmit a RF signal carrying a predefined command for causing the locator transponder 5 to switch from the localization mode to the idle mode, so as to enable said locator transponder 5 to start having again a very low power consumption.

Two modifications can be conveniently made, singularly or together, to the first locator system 1:
- the functions performed by the locator system control centre 2 may be conveniently carried out by the SAR system 4 (for example, by the control and processing ground station 42 or by a SAR operations centre of said SAR system 4), thereby resulting in no locator system control centre 2 being present in the first locator system 1; and/or
- the paging step (block 13 in FIG. 2) may be conveniently carried out by the SAR system 4 itself (in particular, by the airborne/satellite SAR 41 appropriately controlled by the control and processing ground station 42) or an ad hoc paging system specifically designed and dedicated to locator transponder activation and, hence, specifically provided in the first locator system 1 to this end, thereby resulting in no communications satellite system/network 3 being employed by the first locator system 1.

Moreover, the first locator system 1 can be used only for localization or also for information transmission by the locator transponder 5. In fact, once geographically located, the locator transponder 5 may be conveniently instructed by the communications satellite system/network 3 (or directly by the SAR system 4) to provide information items with a transmission mechanism similar to the aforesaid spread spectrum watermarking step (block 16 in FIG. 2).

The locator transponder 5 may be arranged substantially in any place (if necessary, also in a hidden way). For example, the locator transponder 5 can be conveniently coupled to a car/truck roof, a freight container, a bike saddle, an iceberg, a ship/freighter, a surfboard, a wild animal, a (cross-country) skier helmet, etc.

In particular, a non-exhaustive and non-limiting list of examples of potential application of the present invention includes:

localization of lost cars, trucks, bikes, etc. and of freighters, ships, surfboards, etc. lost at sea;
localization of personal belongings;
mapping of animal migratory flows;
tracking of icebergs and floating platforms;
localization of military vehicles, weapons, troops, etc. (for instance, for search and rescue purposes);
localization of tactical body armors and other tactical infrastructures;
criminal tagging with low probability of interception;
increase in visibility of reference geographical points for SAR imaging;
monitoring of the position and integrity of overhead power lines and external piping.

From the foregoing the technical advantages of the first locator system 1 are immediately clear.

In particular, it is important to point out that the first locator system 1 can serve an extremely high number of users 6, thanks to the use of spread spectrum watermark sequences (conveniently, in addition to reliable multiuser detection) and thanks to the minimization of the temporary identification code length. In fact, since only few locator transponders 5 are supposed to be located at the same time, the temporary identification code, and hence the random information content to be received by the SAR system 4 for locator transponder identification, can be reduced to the minimum.

Moreover, the first locator system 1 can be advantageously exploited along with, and without impairing, normal SAR operation and performance.

Additionally, the first locator system 1 can exploit a cheap, coin-sized locator transponder 5 that can use only 1 mW transmission power, can be equipped with a very small battery and is capable of remaining active for years with no battery replacement.

It is worth noting also that the first locator system 1 provides a localization service with widespread, worldwide coverage with low probability of interception and with on demand remote activation of the locator transponders 5.

Furthermore, it is important to point out that none of the currently known SAR-based localization technologies:

employs locator devices with as low power consumption as the locator transponder 5;
employs locator devices activatable only when necessary;
uses a spread spectrum (paging) signal to activate locator devices;
uses permanent and temporary identification codes;
exploits spread spectrum watermarking concepts to stay below the clutter level;
uses watermarking synchronization sequences;
uses spread spectrum watermarks for transmitting temporary identification codes (or data);
minimizes the length of transmitted identification codes;
provides for watermarks to be reliably removed from SAR images;
avoids interference in SAR images:
uses multiuser detection;
allows a widespread community of locator devices to coexist in a SAR system.

Finally, it is worth noting that processing optimizations can be made to the first locator system 1 to improve localization and tracking of moving locator transponders 5.

2. Radar/ISAR-Based Embodiments of the Present Invention

With different visibility scope, the present invention can advantageously exploit, not only an airborne or spaceborne SAR, but also an Inverse Synthetic Aperture Radar (ISAR) system or even a generic radar system, without any substantial modification to the teachings of the invention.

In particular, the teachings of the present invention can be advantageously applied, with no substantial modification, to any radar/ISAR system, installed at a fixed location on the ground or on board a naval unit (such as a ship), an aircraft/drone/UAV, a (land) vehicle or any other platform being it aerial, maritime or on the ground.

Therefore, the present paragraph deals with a radar/ISAR-based embodiment of the present invention.

Clearly, the applications of the present invention can be slightly or substantially different in case of radar, SAR or ISAR. In fact, the visibility scope of a satellite SAR is global and the activation of the locator transponders is, in that case, most likely entrusted to a communications satellite system/network (or to the satellite SAR itself), while radar/ISAR systems, and even airborne SARs, typically have a regional visibility scope and, hence, the activation of the locator transponders may (but not necessarily) be more efficiently entrusted to the radar/ISAR/airborne-SAR system itself or to an ad hoc paging system that is specifically designed and dedicated to locator transponder activation and that is conveniently (but not necessarily) integrated into the radar/ISAR/airborne-SAR system.

Radar systems exploited by the present invention may or may not need ad-hoc focusing algorithms; similarly, speed detection may or may not be requested with the associated algorithms. In conclusion, for each radar system used, processing algorithms can be specifically tailored on the specific radar case considered.

For example, some radar systems, such as imaging radar systems, essentially observe target(s) as if capturing images through a sort of distorting lens and, hence, need (after having collected the so-called layer 1 products, also named raw data) to refocus images and may extract, contextually, target location information and, if required, also target speed information.

Depending on whether the used radar is two-dimensional (2D) or three-dimensional (3D), the focusing and image formation algorithms are different. Moreover, depending on whether the radar is fixed or moving and observes a moving or fixed target, focusing and image formation algorithms are different (e.g., if the radar is moving, focusing procedure conveniently encompasses range and azimuth focusing and special handling of moving targets). Therefore, in the context of the present invention, every radar system used (including SAR and ISAR systems) applies its own refocusing, imaging and target's speed measuring algorithms (or a subset thereof). However, localization procedure according to the present invention substantially remains always the same. In particular, in any of the possible radar cases, the locator transponder (with all the previously described innovations, at system and device level) will play the same role as any natural target plays in the radar scene and will provide much more brilliance than normal targets that the radar/SAR/ISAR normally sees. The locator transponder will also feature the distinguishable identifier that enables its geographical localization and identification, as well as locator transponder speed determination. Last but not least, sub-wavelength position accuracy of the locator transponder is possible via interferometric SAR or radar techniques if the locator transponder includes circuitry for locking its transmit signal onto the received radar chirps carrier phase, enabled by proper phase locked loop (PLL) techniques performed by the locator transponder.

In addition, the locator transponder reacts to the SAR/ISAR/radar signals only after its activation via the procedure described in the previous paragraph. Such a procedure encompasses a slow information flow for locator target activation and the provision of a short temporary identifier, which is then used to watermark the radar/SAR/ISAR image to enable target localization and, conveniently, also measuring of target's speed and even execution of one or more predefined interferometry techniques to improve localization accuracy.

The above procedures are general with respect to the specific waveform that the radar/SAR/ISAR transmits to scan the area of visibility; in particular, a train of such waveforms, properly modulated in phase, amplitude or position, can be driven by a spread spectrum code superimposition to generate the needed image watermark.

A difference between the radar and SAR cases can be the fact that, in the SAR case, a global communications system can be advantageously used to activate the locator transponder, which is then searched by the SAR system, being it either airborne or spaceborne, while in the radar case (in particular, with fixed radars) it may be more convenient to entrust locator transponder activation to the radar(s) itself/themselves. In fact, in the radar case, locator transponder activation may be conveniently performed via a spread spectrum signal that may be either delivered via a normal communications system (of local visibility scope) or via a sequence of inverse chirps, as an additional signal emitted by the radar itself, driven by a spread spectrum code so that negligible cross-talk occurs among radar sounding/scanning chirps/signals (used for image and/or localization and/or speed measurement) and the spread spectrum signal activating (awakening) the locator transponder.

The above principles can be applied to monostatic radars, bistatic radars, secondary surveillance radars, independently of the operating frequency, to Inverse Synthetic Aperture Radars (ISARs), Moving Target Indicator radars, Pulse Doppler radars, Air Defense Radars designed to detect air targets and determine their position, path, and speed in a relatively large area, 3D radar, etc.

Since the typical distance and accuracy of state-of-the-art radars or 3D radars can be about 600 km with a 1 m resolution capability, the power expected back by the radar/SAR/ISAR is not substantially different than the one received by a spaceborne SAR (being radar-to-target distance similar and difference associated only with bigger antenna size and higher available power in ground radars when compared with satellite or airborne SARs).

The need for artificially tagging either a vehicle (ground or aerial), or a man, or a moving or fixed land mass (landmarking) or a strategical reference object, is of remarkable importance in Battle Field Surveillance Radars and in any of the following applications:

surveillance radars to alert combat troops of hostile and unknown aircrafts, cruise missiles and UAVs;

navigation radars for fixing a vessel's position with sufficient accuracy to allow safe passage;

weapon control radars to provide information used to guide missiles/weapons to a hostile target.

A locator transponder according to the present invention can add unprecedented potential to all of the above-listed radars applications.

Added functionalities and unprecedented safety, and control applications can be added by using the locator system according to the present invention in ATC radars, traditionally divided into five types:

Airport Surveillance Radar (ASR) used for the identification of aircrafts, determination of aircrafts approach sequence and for individual aircraft approach controls by Air Traffic Security operators; in this case, upon necessity, on-demand selective activation of locator transponders can be implemented, adding on the transport locator code also a safety/alarm indicator flag that can be embedded in the image watermark together with the temporary identifier (the same can be advantageously applied also to the following different-type ATC radars);

Precision Approach Radars (PAR) used to guide aircraft to safe landing under conditions approaching zero visibility;

Surface Movement Radars (SMR) provide surveillance cover for the manoeuver area, which is defined as that used for the take-off, landing and taxiing of aircrafts;

in-route radars that displays radar data to air traffic controllers in the in-route environment at a maximum range up to 450 km.

In view of the foregoing, substantially any radar can benefit from the present invention thereby enabling locating (and, conveniently, also estimating the speed of and/or imaging and/or locating based on interferometry) the locator transponders. In particular, it is worth noting that, for general radars systems, the present invention encompasses:

1) a radar-based system and a locator transponder based on any form of radar (including SAR and ISAR), with selective paging and awakening of one locator transponder among a large community of locator transponders, with selection via a permanent identification code that is long and used for locator transponder paging, while a shorter temporary identification code is assigned;

2) spread spectrum encoding of the permanent identification code and of the short temporary identification code as well as their simultaneous delivery;

3) transmission, in the area of radar scope, of radar signals and receiving, from the area of radar scope, of echo signals from surfaces, objects and targets being them either passive or active reflectors, with or without specific radar signals conditioning/processing;

4) upon reception by the locator transponder of one or more radar signals transmitted by the radar system, generating and transmitting, by said locator transponder, a sequence of watermarked radar echo signals in which a spread spectrum watermarking signal is embedded, wherein said spread spectrum watermarking signal carries the temporary identification code; and 5) carrying out, by the radar system, localization operations that include
   detecting, in the received echo signals, the sequence of watermarked radar echo signals transmitted by the locator transponder,
   extracting the temporary identification code carried by the spread spectrum watermarking signal embedded in the sequence of watermarked radar echo signals detected,
   forming a radar/ISAR image on the basis of the received echo signals, and
   determining a location of the locator transponder in the formed radar/ISAR image on the basis of the sequence of watermarked radar echo signals detected.

6) conveniently, due to the compression of the temporary identification code and the knowledge of the active temporary identification codes by the radar image processor, a perfect cancellation of the generated watermark from the radar image can be accomplished;

7) brilliance over the clutter is achieved by spread spectrum watermarking and the resulting processing gain.

Conveniently, the watermark can be made such that the processing performed by the radar image processor can be based onto the same spread spectrum code matched filter for all the locator transponders, and a gain is guaranteed also by the knowledge of the few temporary identifiers activated. A low-complexity and high-efficiency localization algorithm is superimposed to the normal radar image processing.

The modifications required to the known radar processing solutions are expected only for the upper layers of the image processing; additionally, dispatching of the paging information to the locator transponder may conveniently occur also in the same bandwidth of the radar signals, benefiting from a high spread spectrum gain (provided that some reasonable locator transponder activation delay can be tolerated).

Figure 9:
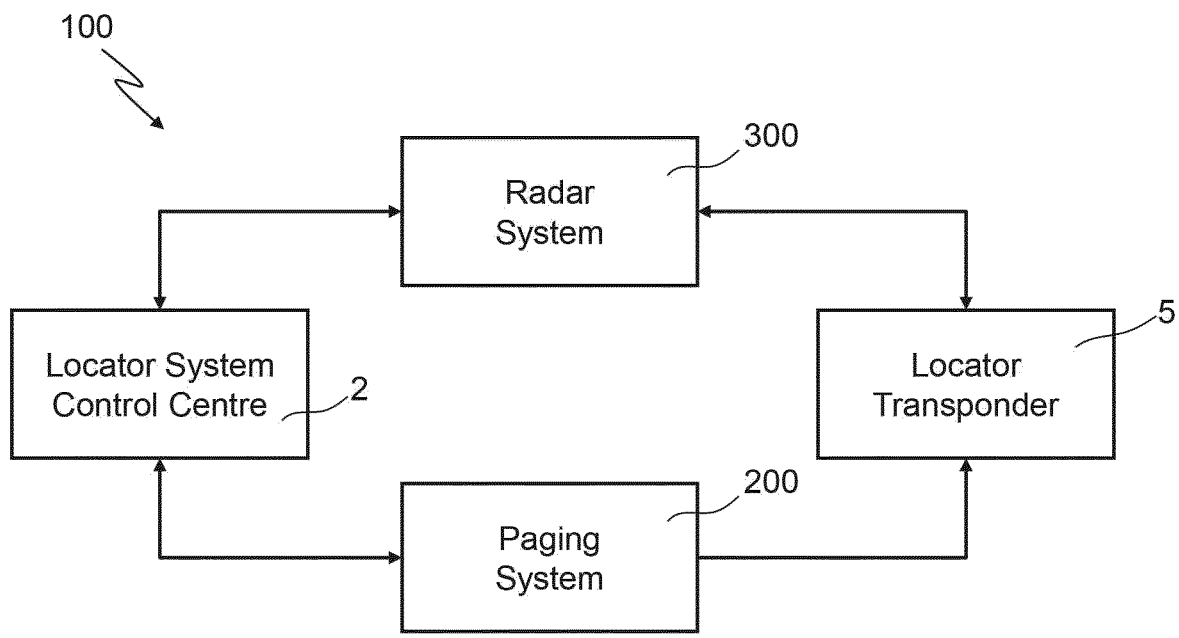
FIG. 9 schematically illustrates a second locator system according to a second preferred, non-limiting embodiment of the present invention.

For a better understanding of the exploitation of radar systems for the present invention, FIG. 9 schematically illustrates a second locator system (denoted as a whole by 100) according to a second preferred, non-limiting embodiment of the present invention.

In particular, the second locator system 100 includes: the locator system control centre 2 shown in FIG. 1 and previously described in detail; a paging system 200; a radar system 300; and the locator transponder 5 shown in FIG. 1 and previously described in detail.

In the second locator system 100, the locator system control centre 2 is connected to the paging system 200 and to the radar system 300.

Figure 10:
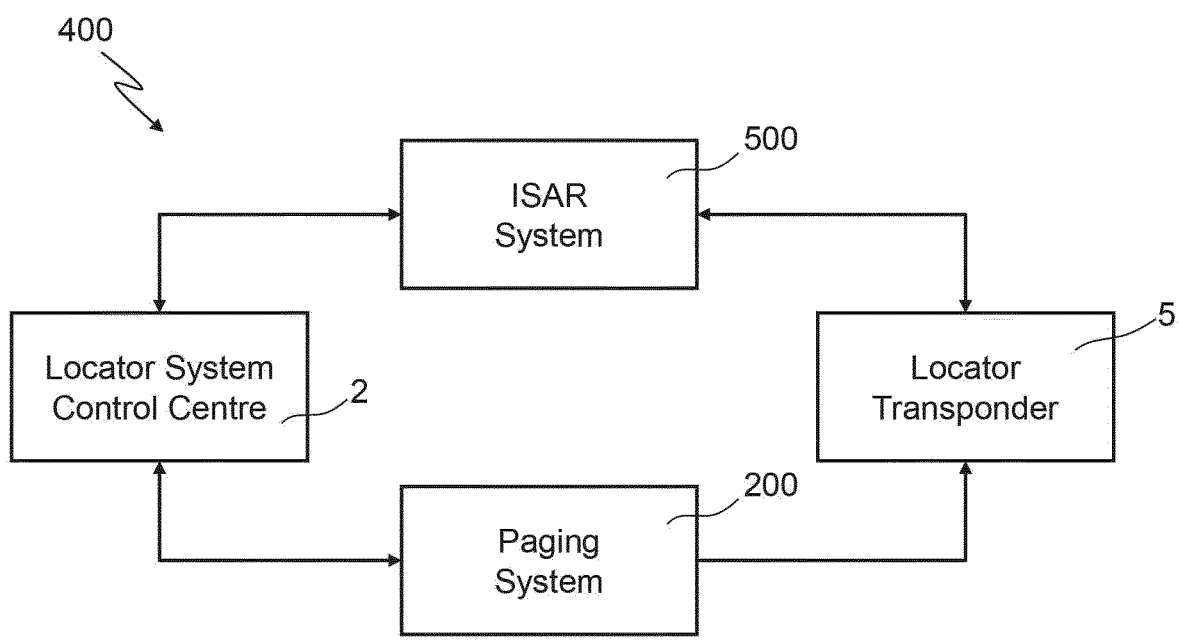
FIG. 10 schematically illustrates a third locator system according to a third preferred, non-limiting embodiment of the present invention.

Moreover, FIG. 10 schematically illustrates a third locator system (denoted as a whole by 400) according to a third preferred, non-limiting embodiment of the present invention based on ISAR.

In particular, the third locator system 400 includes: the locator system control centre 2 shown in FIGS. 1 and 9 and previously described in detail; the paging system 200 shown in FIG. 9; an ISAR system 500; and the locator transponder 5 shown in FIGS. 1 and 9 and previously described in detail.

In the third locator system 400, the locator system control centre 2 is connected to the paging system 200 and to the ISAR system 500.

The second and third locator systems 100 and 400 are designed to provide an on demand localization service to locate targets (such as objects, vehicles, vessels, people, animals, etc.), upon request of users, within the coverage regions of the radar system 300 and the ISAR system 500, respectively.

The second and third locator systems 100 and 400 are designed to operate substantially in the same way, mutatis mutandis, as the first locator system 1 shown in FIG. 1 and previously described in detail.

With respect to the first locator system 1 that, if based on a satellite SAR, provides a global coverage, the second and third locator systems 100 and 400, even if based on the use of multiple cooperating radars (e.g., a coastal distribution of radars), provide a more regional coverage.

In the second and third locator systems 100 and 400, the paging system 200 is specifically designed and dedicated to locator transponder activation and may be a system distinct from the radar/ISAR system 300,500 or may be directly integrated into the radar/ISAR system 300,500 and use RF front end thereof to transmit spread spectrum paging signals. Alternatively, the locator transponder activation may be performed directly by the radar/ISAR system 300,500 (for example by transmitting sequences of properly coded inverse chirps or signals with minimum cross-correlation with the radar/ISAR scanning signals/waveforms (i.e., those used for radar/ISAR detection/imaging)).

Figure 11:
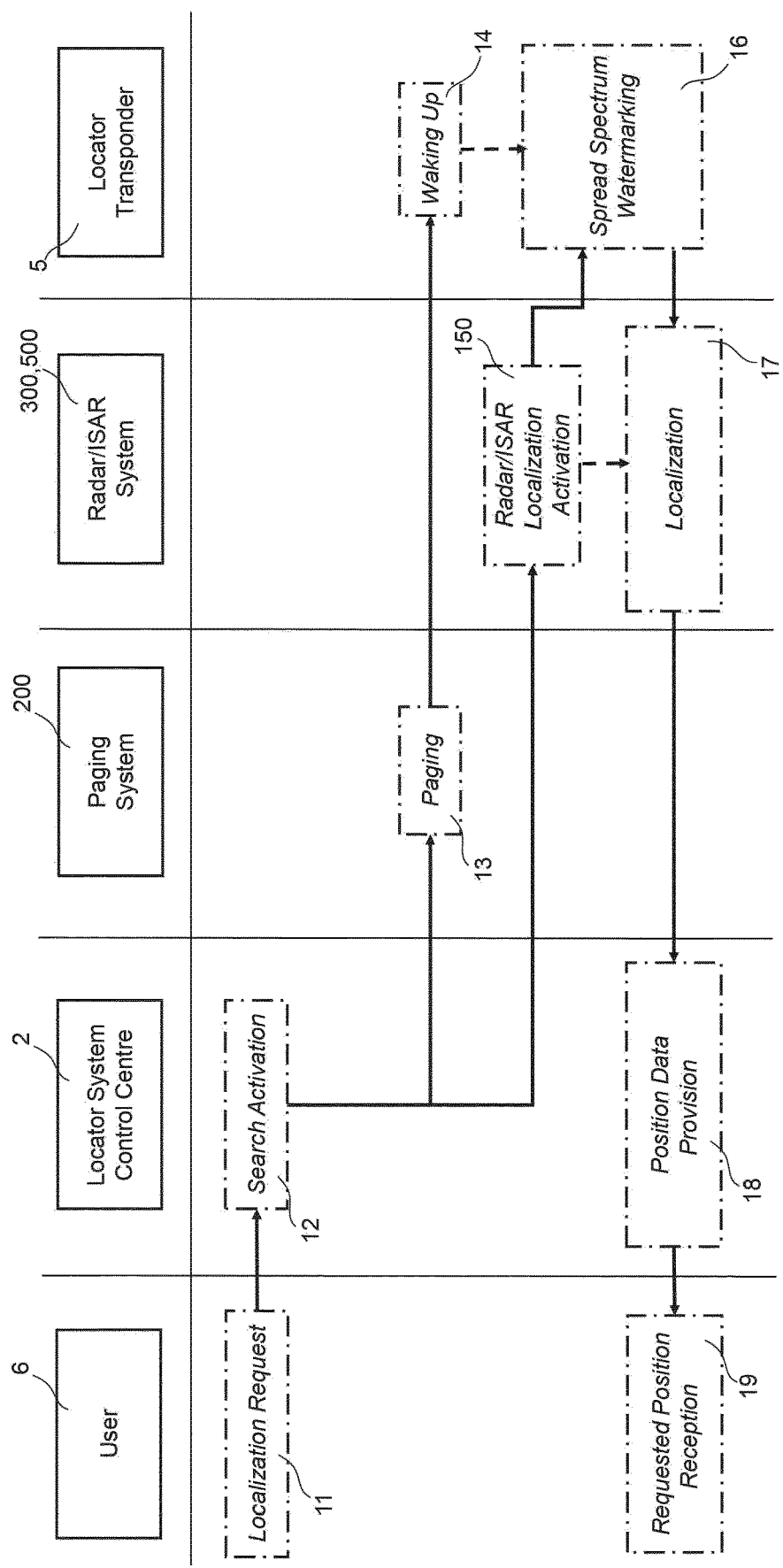
FIG. 11 schematically illustrates a preferred, non-limiting embodiment of a localization method implementable by the second and third locator systems of FIGS. 9 and 10.

FIG. 11 schematically illustrates a preferred, non-limiting embodiment of a localization method performed, in use, by the second and third locator systems 100 and 400.

In this connection, it is worth noting that the localization method shown in FIG. 11 substantially corresponds, mutatis mutandis, to that one shown in FIG. 2, previously described in detail and performed by the first locator system 1 (please note that the block 15 in FIG. 2 named "SAR Localization Activation" is replaced in FIG. 11 with a block 150 named "Radar/ISAR Localization Activation" only for terminology matching reasons, but the two method steps substantially correspond, mutatis mutandis, to each other).

In view of the foregoing, it is important to stress the point that what has been previously described with relation to the first locator system 1 and its operation applies, mutatis mutandis, also to the second and third locator systems 100 and 400 and their operation. Therefore, the operation of said second and third locator systems 100 and 400 will not be described in detail, remaining valid, mutatis mutandis, what previously described about the first locator system 1 and what shown in FIGS. 1, 2, 3, 4, 5, 6, 7 and 8 (and related description).

In this connection, it is worth noting that, in the localization step 17, the radar and ISAR systems 300 and 500 may be conveniently configured to:
   compute also the speed of the locator transponder 5; and/or
   compute the position of the locator transponder 5 based on (i.e., by carrying out) one or more predefined interferometry techniques; wherein, in the locator transponder 5, phase coherence of subsequent watermarked waveforms emitted by said locator transponder 5 may be conveniently guaranteed by phase locked loop (PLL) or similar carrier lock onto the received radar/ISAR (or SAR) scanning waveforms (with reference to FIG. 5, the synchronization means 54 for performing synchronization with the received radar signals may be conveniently configured to perform a predefined PLL algorithm (or similar) to enable phase coherent interferometric processing on multiple sequential acquisitions by the radar/ISAR system 300,500).

In particular, interferometry with the locator transponder 5 allows sub-wavelength accuracy of the localization and of the speed of the target, with an accuracy in speed definition, which is of the order of the wavelength per second or smaller, depending on the radar/SAR/ISAR pulse repetition frequency (PRF). Carrier can be pragmatically defined as the centre frequency of the RF bandpass chirp.

In the end, it is important to stress the point that the second and third locator systems 100 and 400 are characterized by the same innovative features, provide the same technical advantages and may be advantageously exploited for the same applications as the first locator system 1 (and, hence, said innovative features, technical advantages and applications will not be described again).

Moreover, it is worth noting that the present invention can be advantageously implemented also by a system comprising/employing one or more radar systems and/or one or more SAR systems and/or ISAR systems.

The invention claimed is:

1. Localization method for locating a target that is coupled with a locator transponder associated with a permanent identification code permanently assigned to said locator transponder;
   the localization method comprising:
   a) upon reception of a user request for locating the target, transmitting, by a paging system or a radar-based system, a spread spectrum paging signal carrying the permanent identification code and a temporary identification code temporarily assigned to the locator transponder, wherein said temporary identification code is shorter than said permanent identification code;
   b) receiving, by the locator transponder, the spread spectrum paging signal and extracting, by said locator transponder, the temporary identification code carried by said spread spectrum paging signal received;
   c) transmitting, by the radar-based system, radar signals towards one or more areas of earth's surface or sky, and receiving, by said radar-based system, echo signals from said one or more areas of the earth's surface or sky;
   d) upon reception by the locator transponder of one or more radar signals transmitted by the radar-based system, generating and transmitting, by said locator transponder, a sequence of watermarked radar echo signals in which a spread spectrum watermarking signal is embedded, wherein said spread spectrum watermarking signal carries the temporary identification code extracted;
   wherein generating and transmitting, by the locator transponder, the sequence of watermarked radar echo signals includes:
   generating a sequence of radar echo signals on the basis of the radar signal(s) received;
   modulating the generated sequence of radar echo signals on the basis of the spread spectrum watermarking signal, thereby obtaining the sequence of watermarked radar echo signals; and
   transmitting said sequence of watermarked radar echo signals;
   wherein the spread spectrum watermarking signal includes a synchronization portion and an information portion;
   wherein the synchronization portion of the spread spectrum watermarking signal is generated on the basis of a first predefined pseudo noise code;
   wherein the information portion of the spread spectrum watermarking signal is generated by applying a first predefined spread spectrum technique to a given signal carrying the temporary identification code extracted;
   wherein said first predefined spread spectrum technique is applied by using a second predefined pseudo noise code, that is the same as, or different than, the first predefined pseudo noise code;
   the localization method further comprising:
   e) carrying out, by the radar-based system, localization operations that include
   detecting, in the received echo signals, the sequence of watermarked radar echo signals transmitted by the locator transponder by detecting the synchronization portion of the spread spectrum watermarking signal embedded in said sequence of watermarked radar echo signals,
   extracting the temporary identification code carried by the spread spectrum watermarking signal embedded in the sequence of watermarked radar echo signals detected by extracting said temporary identification code from the information portion of the spread spectrum watermarking signal embedded in said sequence of watermarked radar echo signals detected, and
   determining a location of the locator transponder on the basis of the sequence of watermarked radar echo signals detected.

2. The localization method of claim 1, wherein the spread spectrum paging signal includes a first portion followed by a second portion;
   wherein the first portion of the spread spectrum paging signal is generated by applying a second predefined spread spectrum technique to the permanent identification code;
   wherein said second predefined spread spectrum technique is applied by using a third predefined pseudo noise code;
   wherein the second portion of the spread spectrum paging signal is generated by applying a third predefined spread spectrum technique to the temporary identification code, said third predefined spread spectrum technique being the same as, or different than, the second predefined spread spectrum technique;
   and wherein said third predefined spread spectrum technique is applied by using a fourth predefined pseudo noise code, that is the same as, or different than, the third predefined pseudo noise code.

3. The localization method according to claim 1, wherein modulating the generated sequence of radar echo signals includes phase modulating said generated sequence of radar echo signals on the basis of the spread spectrum watermarking signal.

4. The localization method according to claim 1, wherein the given signal includes a temporary-identification-code-related portion followed by an error detection portion; wherein said temporary-identification-code-related portion carries the temporary identification code and said error detection portion carries an error detection code computed on the basis of the temporary identification code.

5. The localization method of claim 4, wherein the temporary identification code is encoded in the temporary-identification-code-related portion of the given signal by using an error correction technique.

6. The localization method according to claim 1, wherein the radar-based system is a radar system or a synthetic aperture radar system or an inverse synthetic aperture radar system.

7. The localization method of claim 6, wherein the localization operations carried out by the radar-based system further include forming an image selected from the group consisting of one or more of a radar image, an SAR image, and an ISAR image on the basis of the received echo signals; and wherein determining a location of the locator transponder includes determining a location of the locator transponder in the formed image on the basis of the sequence of watermarked radar echo signals detected.

8. The localization method of claim 7, wherein forming the image selected from the group consisting of one or more of a radar image, an SAR image, and an ISAR image on the basis of the received echo signals includes:
   removing, from the received echo signals, the sequence of watermarked radar echo signals detected, thereby obtaining watermark-free echo signals; and
   forming a watermark-free image selected from the group consisting of one or more of a watermark-free radar image, a watermark-free SAR image, and a watermark-free ISAR image on the basis of the watermark-free echo signals.

9. The localization method of claim 8, wherein the sequence of watermarked radar echo signals detected are removed from the received echo signals by using a multiuser detection technique.

10. The localization method according to claim 1, wherein the paging system is either (i) a communications satellite system/network, or (ii) a system that is designed for locator transponder activation and that is integrated into the radar-based system or distinct therefrom.

11. Locator system (1) for performing the method as claimed in claim 1, including:
   a paging system configured to carry out the step a) of the localization method as claimed in claim 1;
   a radar-based system configured to carry out the steps c) and e) of said localization method as claimed in claim 1; and
   a locator transponder configured to carry out the steps b) and d) of said localization method as claimed in claim 1.

12. The locator system of claim 11, wherein the radar-based system is a radar system or a synthetic aperture radar system or an inverse synthetic aperture radar system.

13. The locator system according to claim 11, wherein the paging system is a communications satellite system/network or the radar-based system or a system designed for locator transponder activation.

14. The locator system according to claim 12, wherein the radar-based system configured to carry out the steps c) and e) of the localization method as claimed in claim 1 is selected from a group that does not include a synthetic aperture radar system or an inverse synthetic aperture radar system.

15. The locator system according to claim 14, further configured to carry out also the step a) of said localization method.

16. The locator system according to claim 12, wherein the radar-based system is a synthetic aperture radar system including:
   an airborne/satellite synthetic aperture radar configured to carry out the step c) of the localization method as claimed in claim 1; and
   a control and processing ground station configured to carry out the step e) of said localization method.

17. The locator system according to claim 16, wherein the airborne/satellite synthetic aperture radar is further configured to carry out the step a) of said localization method.

18. The locator system according to claim 12, wherein the radar-based system is an inverse synthetic aperture radar system configured to carry out the steps c) and e) of the localization method as claimed in claim 1.

19. The locator system according to claim 18, wherein the inverse synthetic aperture radar system is further configured to carry out the step a) of said localization method.

20. The locator system according to claim 11, wherein the locator transponder configured to carry out the steps b) and d) of the localization method as claimed in claim 1 is configured to operate in at least two modes.

21. The locator system according to claim 20, wherein the locator transponder is configured to operate in:
   an idle mode in which
      spread spectrum paging signals are received, and
      the received spread spectrum paging signal are checked to determine whether the received spread spectrum paging signals carry the permanent identification code associated with said locator transponder; and
   a localization mode in which
      the temporary identification code carried by a received spread spectrum paging signal carrying the permanent identification code associated with said locator transponder is extracted, and
      the step d) of said localization method is carried out;
   wherein the locator transponder is further configured to switch from the idle mode to the localization mode when the received spread spectrum paging signal carrying the permanent identification code associated with said locator transponder is detected.

22. The locator system according to claim 21, wherein the locator transponder is further configured to switch from the localization mode to the idle mode at one or both of:
   after a predefined time of operation in the localization mode, and
   upon reception of a radiofrequency signal carrying a predefined command.

* * * * *